(12) United States Patent
Yang et al.

(10) Patent No.: US 10,645,145 B2
(45) Date of Patent: May 5, 2020

(54) METHOD AND APPARATUS FOR ACCELERATING DATA TRANSMISSION IN A NETWORK COMMUNICATION SYSTEM

(71) Applicant: Tencent Technology (Shenzhen) Company Limited, Shenzhen (CN)

(72) Inventors: Yang Yang, Shenzhen (CN); Liqiang Xie, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 561 days.

(21) Appl. No.: 14/991,735

(22) Filed: Jan. 8, 2016

(65) Prior Publication Data

US 2016/0127450 A1    May 5, 2016

Related U.S. Application Data

(63) Continuation of application No. PCT/CN2014/095064, filed on Dec. 26, 2014.

(30) Foreign Application Priority Data

Dec. 26, 2013    (CN) .......................... 2013 1 0733449

(51) Int. Cl.
　　*G06F 15/173*　　(2006.01)
　　*H04L 29/08*　　(2006.01)
　　*H04L 29/06*　　(2006.01)
(52) U.S. Cl.
　　CPC .......... *H04L 67/06* (2013.01); *H04L 67/2842* (2013.01); *H04L 69/08* (2013.01); *H04L 69/16* (2013.01)

(58) Field of Classification Search
　　CPC ...... H04L 67/2842; H04L 69/08; H04L 69/16
(Continued)

(56) References Cited

U.S. PATENT DOCUMENTS 6,532,217 B1 * 3/2003 Alkhatib ................. H04L 29/06
　　　　　　　　　　　　　　　　　　　　370/252
6,772,375 B1 * 8/2004 Banga ..................... H04L 69/16
　　　　　　　　　　　　　　　　　　　　714/18

(Continued)

FOREIGN PATENT DOCUMENTS

CN　　　101309282 A　　11/2008
CN　　　101753603 A　　6/2010
WO　　WO 2012116591 A1　9/2012

OTHER PUBLICATIONS

Tencent Technology, IPRP, PCT/CN2014/095064, dated Jun. 28, 2016, 4 pgs.

(Continued)

*Primary Examiner* — Thuong Nguyen
(74) *Attorney, Agent, or Firm* — Morgan, Lewis & Bockius LLP

(57) ABSTRACT

A second network node receives a first download request from a first network node. After determining that the first data object requested by the first node is not locally stored at the second network node, the second node sends a second download request for the first data object to a third network node and records a mapping relationship for the three network nodes. After receiving N1 data packets from the third network node and determining that a total amount of data in the N1 data packets corresponding to the first data object exceeds a predefined data amount threshold, the second node starts transmitting the data in the N1 data packets corresponding to the first data object to the first network node according to the recorded mapping relationship.

18 Claims, 5 Drawing Sheets

(58) Field of Classification Search
USPC ........ 709/223, 230, 203, 224; 370/350, 392, 370/230, 252, 351
See application file for complete search history.

(56) References Cited

U.S. PATENT DOCUMENTS

| | | | | |
|---|---|---|---|---|
| 7,873,025 B2* | 1/2011 | Patel | ..................... | H04J 3/0685 370/350 |
| 2003/0021268 A1* | 1/2003 | Adolfsson | ........... | H04L 41/0253 370/389 |
| 2005/0033990 A1* | 2/2005 | Harvey | ................ | H04L 63/105 726/4 |
| 2006/0047839 A1* | 3/2006 | Tate | ........................ | H04L 69/16 709/230 |
| 2006/0146729 A1* | 7/2006 | Krautkremer | ....... | H04L 43/0852 370/252 |
| 2008/0127323 A1* | 5/2008 | Soin | ........................ | G06F 21/31 726/12 |
| 2011/0261817 A1* | 10/2011 | Morris | .................... | H04L 45/00 370/392 |
| 2013/0176847 A1* | 7/2013 | Zhao | ....................... | H04L 47/40 370/230 |
| 2013/0235878 A1* | 9/2013 | Hirota | ....................... | H04L 7/00 370/412 |
| 2014/0181179 A1* | 6/2014 | Clark | ................... | H04L 65/608 709/203 |
| 2014/0189093 A1* | 7/2014 | du Toit | ................... | H04L 47/10 709/224 |
| 2015/0365483 A1* | 12/2015 | Xiong | .................... | H04L 29/06 709/203 |
| 2016/0127450 A1* | 5/2016 | Yang | ....................... | H04L 69/16 709/223 |

OTHER PUBLICATIONS

Tencent Technology, ISRWO, PCT/CN2014/095064, dated Mar. 25, 2015, 6 pgs.

* cited by examiner

METHOD AND APPARATUS FOR ACCELERATING DATA TRANSMISSION IN A NETWORK COMMUNICATION SYSTEM

RELATED APPLICATIONS

This application is a continuation application of PCT Patent Application No. PCT/CN2014/095064, entitled "METHOD AND APPARATUS FOR ACCELERATING DATA TRANSMISSION IN A NETWORK COMMUNICATION" filed on Dec. 26, 2014, which claims priority to Chinese Patent Application No. 201310733449.4, "METHOD AND APPARATUS FOR DATA TRANSMISSION AND COMMUNICATION SYSTEM," filed on Dec. 26, 2013, both of which are hereby incorporated by reference in their entirety.

TECHNICAL FIELD

The present application relates to the field of network technologies, and in particular, to a method and related apparatus for accelerating data transmission in a network communication system.

BACKGROUND

With rapid development of Internet technologies and terminal technologies, there are many Internet services related to network data transmission and data exchange. Accelerating transmission of data between network nodes is an important means to improve the quality of service and enhance user experience.

The conventional approach has the following scenario, a network node A requests a file X from a network node B, the network node B finds that the file X is not cached locally, and thus the network node B requests the file X from a network node C, and after acquiring the complete file X from the network node C, the network node B forwards the file X to the network node A. In such a scenario, the network node B may be regarded as a transit network node, and in many actual scenarios, when a file requesting network node acquires a file, there may be multiple transit network nodes assisting in acquisition.

During research and practice, the inventor of the present application finds that the conventional approach at least has the following technical problems: in the existing mechanism, each transit network node needs to acquire a complete file from an upstream network node and then forwards the file to a downstream network node, and thus, when there are multiple transit network nodes, the original file requesting network node may need to wait a long time to get the requested file, and a too large delay may greatly affect user product experience.

SUMMARY

The above deficiencies and other problems associated with the conventional approach of data transfer are reduced or eliminated by the present application disclosed below. In some embodiments, the present application is implemented in a computer system that has one or more processors, memory and one or more modules, programs or sets of instructions stored in the memory for performing multiple functions and communicating with one or more client devices (e.g., a computer or a smartphone) that has one or more processors, memory and one or more modules, programs or sets of instructions stored in the memory for performing multiple functions. Instructions for performing these functions may be included in a computer program product configured for execution by one or more processors.

One aspect of the present application involves a computer-implemented method for accelerating data transmission in a network system performed by a computer system acting as a second network node. The second network node receives a first download request for a first data object from a first network node through a first transport layer protocol connection between the first network node and the second network node. The second network node determines whether the first data object is locally stored at the second network node or not. When the first data object is not locally stored at the second network node, the second network node establishes a second transport layer protocol connection to a third network node, sends a second download request for the first data object to the third network node through the second transport layer protocol connection, and records a mapping relationship between the first transport layer protocol connection and the second transport layer protocol connection. After receiving N1 data packets associated with the first data object from the third network node through the second transport layer protocol connection and determining that a total amount of data in the N1 data packets corresponding to the first data object exceeds a predefined data amount threshold, the second network node starts transmitting the data in the N1 data packets corresponding to the first data object to the first network node through the first transport layer protocol connection according to the recorded mapping relationship between the first transport layer protocol connection and the second transport layer protocol connection.

Another aspect of the present application involves a computer system acting as a second network node including one or more processors, memory, one or more program modules stored in the memory and to be executed by the one or more processors. The program modules further include instructions for: receiving a first download request for a first data object from a first network node through a first transport layer protocol connection between the first network node and the second network node; determining whether the first data object is locally stored at the second network node or not; in accordance with a determination that the first data object is not locally stored at the second network node: establishing a second transport layer protocol connection between the second network node and a third network node; sending a second download request for the first data object to the third network node through the second transport layer protocol connection; and recording a mapping relationship between the first transport layer protocol connection and the second transport layer protocol connection; and after receiving N1 data packets associated with the first data object from the third network node through the second transport layer protocol connection and determining that a total amount of data in the N1 data packets corresponding to the first data object exceeds a predefined data amount threshold: starting transmitting the data in the N1 data packets corresponding to the first data object to the first network node through the first transport layer protocol connection according to the recorded mapping relationship between the first transport layer protocol connection and the second transport layer protocol connection.

Another aspect of the present application involves a non-transitory computer readable storage medium stores one or more program modules in connection with a computer system acting as a second network node having one or more processors, the program modules including instructions for execution by one or more processors. The instructions, when executed by the one or more processors, cause the computer system to perform the following instructions: receiving a first download request for a first data object from a first network node through a first transport layer protocol connection between the first network node and the second network node; determining whether the first data object is locally stored at the second network node or not; in accordance with a determination that the first data object is not locally stored at the second network node: establishing a second transport layer protocol connection between the second network node and a third network node; sending a second download request for the first data object to the third network node through the second transport layer protocol connection; and recording a mapping relationship between the first transport layer protocol connection and the second transport layer protocol connection; and after receiving N1 data packets associated with the first data object from the third network node through the second transport layer protocol connection and determining that a total amount of data in the N1 data packets corresponding to the first data object exceeds a predefined data amount threshold: starting transmitting the data in the N1 data packets corresponding to the first data object to the first network node through the first transport layer protocol connection according to the recorded mapping relationship between the first transport layer protocol connection and the second transport layer protocol connection.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To illustrate the technical solutions according to the embodiments of the present application or the conventional approach more clearly, the accompanying drawings for describing the embodiments or the conventional approach are introduced briefly in the following. Apparently, the accompanying drawings in the following description are only some embodiments of the present application; persons of ordinary skill in the art may obtain other drawings according to the accompanying drawings without paying any creative efforts.

Like reference numerals refer to corresponding parts throughout the several views of the drawings.

DESCRIPTION OF EMBODIMENTS

Figure 1:
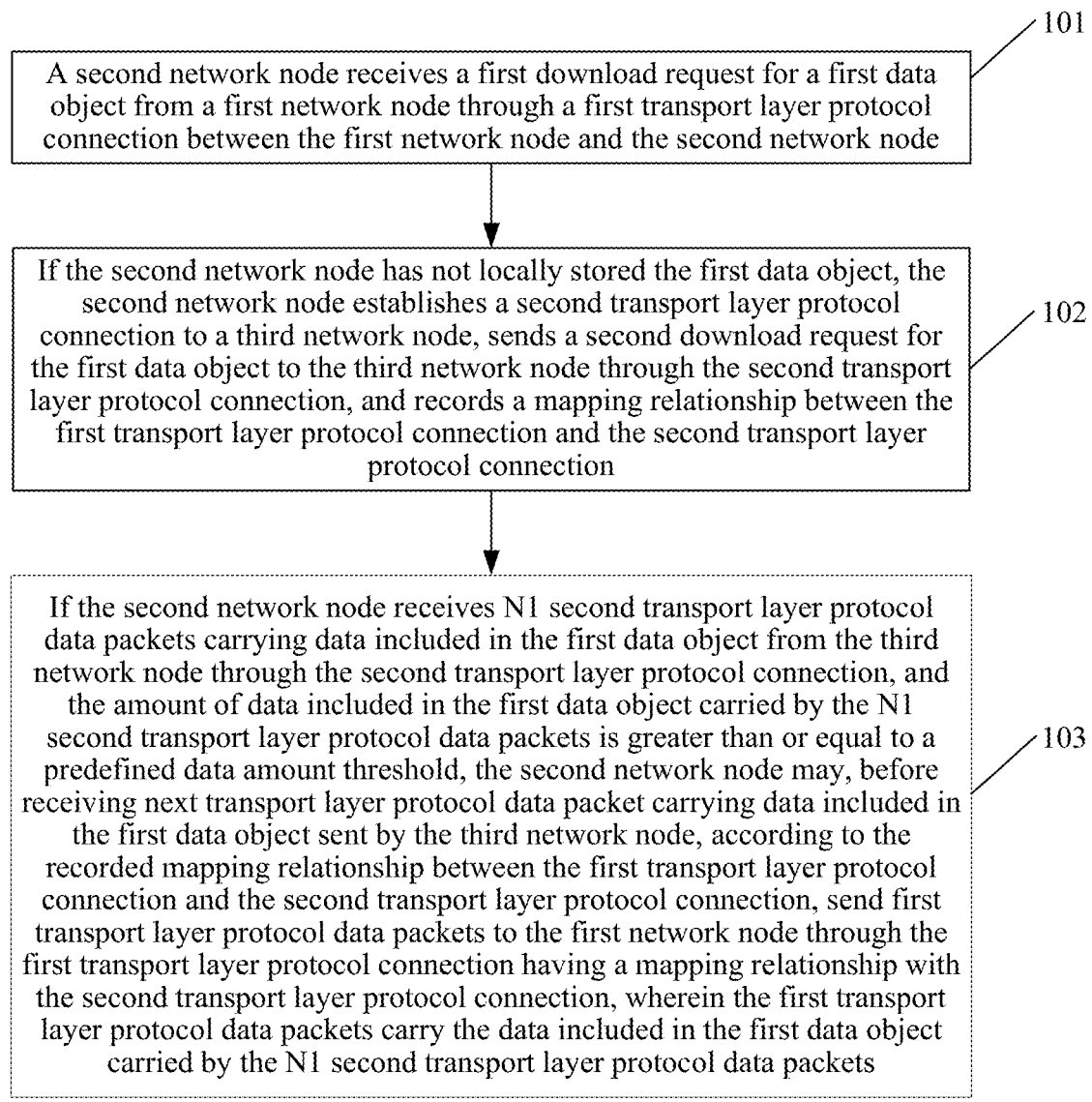
FIG. 1 is a schematic view of a flow of a data transmission acceleration method according to an embodiment of the present application.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The embodiments of the present application provide methods and related apparatuses for data transmission and a communication system, so as to expect reduction of data transmission delay in the presence of transit network nodes.

In order to make persons skilled in the art better understand the solution of the present application, the technical embodiments of the present application will be clearly and fully described below with reference to the accompanying drawings in the embodiments of the present application. It is obvious that the embodiments to be described are only a part rather than all of the embodiments of the present application. All other embodiments derived by persons of ordinary skill in the art based on the embodiments of the present application without carrying out creative activities should fall within the scope of the present application.

Detailed description is given below respectively.

The terms "first," "second," "third," "fourth" and the like (if present) in the specification and claims as well as the accompanying drawings of the present application are used to distinguish similar objects, instead of being used to describe a specific order or sequence. It should be understood that data so used may be exchanged under appropriate circumstances, so that the embodiments of the present application described herein, for example, could be implemented in orders in addition to those illustrated or described herein. Besides, the terms "include" and "have" or any other variations intend to cover non-exclusive inclusion, for example, processes, methods, systems, products or devices including a series of steps or elements are not necessarily limited to the steps or elements listed, but may include other steps or elements not explicitly listed or inherent in the processes, methods, products or devices.

To better facilitate the embodiments of the present application, some concepts possibly introduced may be briefly introduced below.

A Content Delivery Network (CDN) means increasing a new network architecture in Internet, which may distribute content of a site server to a network "edge" closet to a user, so that the user could obtain required content nearby, to solve the condition of Internet network congestion, and improve a response speed of access of the user to a website.

An Outside Center (OC) is a network node in a CDN.

Back-to-source generally means that a user terminal requires a file or file slice from an OC, the OC first checks whether it has stored the file or file slice, and if it has stored the file or file slice and storage has not expired, directly returns the file or file slice to the user terminal; if the OC checks that it has not stored the file or file slice or the storage has expired, the OC first goes to its source server to request a latest file or file slice, and then returns the requested file or file slice to the user.

A distribution point is an access point or a transit network node of the CDN, and the distribution point may cache part of data but usually does not have the full amount of data. In terms of back-to-source servers, the distribution point may be configured with a back-to-source server, and the distribution point caches non-hit data and may pull the data from the configured back-to-source server. The back-to-source server may also configure its next-hop back-to-source server, and configuration is performed stage to stage until a center point of the CDN. The center point is an ultimate back-to-source server, an ultimate network node of a CDN network, and the full amount of data may be pulled from the center point.

In some embodiments of the data transmission acceleration method according to the present application, one data transmission acceleration method may include the following steps: a second network node receives a first download request for a first data object sent by a first network node through a first transport layer protocol connection; if the second network node has not locally stored the first data object, the second network node may establish a second transport layer protocol connection to a third network node, send a download request for the first data object to the third network node through the second transport layer protocol connection, and record a mapping relationship between the first transport layer protocol connection and the second transport layer protocol connection; if the second network node receives N1 second transport layer protocol data packets carrying data included in the first data object sent by the third network node through the second transport layer protocol connection, and the amount of data included in the first data object carried by the N1 second transport layer protocol data packets is greater than or equal to a predefined data amount threshold, the second network node, before receiving next transport layer protocol data packet carrying data included in the first data object sent by the third network node, according to the recorded mapping relationship between the first transport layer protocol connection and the second transport layer protocol connection, sends first transport layer protocol data packets to the first network node through the first transport layer protocol connection having a mapping relationship with the second transport layer protocol connection, wherein the first transport layer protocol data packets carry the data included in the first data object carried by the second transport layer protocol data packet received, wherein the N1 is a positive integer.

First, FIG. 1 is a schematic view of a flow chart of one data transmission acceleration method according to one embodiment of the present application. As shown in FIG. 1, the one data transmission acceleration method according to one embodiment of the present application may include the following content.

101. A second network node receives a first download request for a first data object sent by a first network node through a first transport layer protocol connection between the first network node and the second network node.

The first network node may be a request-starting network node of the first data object (that is, initiate a download request for downloading the first data object), and the first network node may also be a transit network node between a data source and a request-starting network node. The first network node may be a distribution point, and may also be a user terminal or the like.

102. If the second network node has not locally stored the first data object, the second network node establishes a second transport layer protocol connection to a third network node, sends a download request for the first data object to the third network node through the second transport layer protocol connection, and records a mapping relationship between the first transport layer protocol connection and the second transport layer protocol connection.

Transport layer protocols corresponding to the first transport layer protocol connection and the second transport layer protocol connection may be the same or different, for example, the transport layer protocol corresponding to the first transport layer protocol connection is a Transmission Control Protocol (TCP), and the transport layer protocol corresponding to the second transport layer protocol connection is also a TCP. Alternatively, the transport layer protocol corresponding to the first transport layer protocol connection is a User Datagram Protocol (UDP), and the transport layer protocol corresponding to the second transport layer protocol connection is also a UDP. Alternatively, the transport layer protocol corresponding to the first transport layer protocol connection is a TCP, and the transport layer protocol corresponding to the second transport layer protocol connection is a UDP, or the transport layer protocol corresponding to the first transport layer protocol connection is a UDP, and the transport layer protocol corresponding to the second transport layer protocol connection is a TCP. Certainly, the transport layer protocols corresponding to the first transport layer protocol connection and the second transport layer protocol connection may be the same or different protocols.

In some embodiments of the present application, the step of recording a mapping relationship between the first transport layer protocol connection and the second transport layer protocol connection may include: generating a mapping relationship record for recording the mapping relationship between the first transport layer protocol connection and the second transport layer protocol connection, wherein the mapping relationship record includes a first protocol field and a second protocol field, wherein the first protocol field may record identification of the first transport layer protocol connection, and the second protocol field may record identification of the second transport layer protocol connection. The mapping relationship record may further include a timestamp field, wherein the timestamp field may record time of receiving a download request for a first data object sent by a first network node through a first transport layer protocol connection between the first network node and the second network node, or the timestamp field may record time of establishing a second transport layer protocol connection between the second network node and a third network node, or the timestamp field may record time of sending a download request for the first data object to the third network node through the second transport layer protocol connection, or the timestamp field may record time of generating the mapping relationship record or the like. Certainly, the mapping relationship record may further include other fields.

103. If the second network node receives N1 second transport layer protocol data packets carrying data included in the first data object sent by the third network node through the second transport layer protocol connection, and the amount of data included in the first data object carried by the N1 second transport layer protocol data packets is greater than or equal to a predefined data amount threshold, the second network node may, before receiving next transport layer protocol data packet carrying data included in the first data object sent by the third network node, according to the recorded mapping relationship between the first transport layer protocol connection and the second transport layer protocol connection, send one or more first transport layer protocol data packets to the first network node through the first transport layer protocol connection having a mapping relationship with the second transport layer protocol connection, wherein the one or more first transport layer protocol data packets carry the data included in the first data object carried by the N1 second transport layer protocol data packets received, wherein the N1 is a positive integer.

In some embodiments of the present application, the predefined data amount threshold is greater than or equal to the amount of data included in the first data object carried by any one first transport layer protocol data packet that the second network node has sent to the first network node; or the predefined data amount threshold is greater than or equal to an average size of the amount of data included in the first data object carried by N2 first transport layer protocol data packets that the second network node has sent to the first network node, wherein the N2 is a positive integer; or the predefined data amount threshold is greater than or equal to the maximum or minimum amount of data included in the first data object carried by first transport layer protocol data packets that the second network node has sent to the first network node; or the predefined data amount threshold is greater than or equal to the maximum or minimum amount of data included in the first data object that could be carried by first transport layer protocol data packets that the second network node has sent to the first network node; or the predefined data amount threshold is greater than or equal to the amount of data included in the first data object carried by any one second transport layer protocol data packet received from the third network node by the second network node; or the predefined data amount threshold is greater than or equal to an average size of the amount of data included in the first data object carried by N3 second transport layer protocol data packets received from the third network node by the second network node, wherein the N3 is a positive integer; or the predefined data amount threshold is greater than or equal to an average size of the amount of data included in the first data object carried by all second transport layer protocol data packets received from the third network node by the second network node; or the predefined data amount threshold is greater than or equal to the maximum or minimum amount of data included in the first data object carried by second transport layer protocol data packets received from the third network node by the second network node; or the predefined data amount threshold is greater than or equal to 0 byte.

Certainly, the predefined data amount threshold may also be another preset value, and of course, the predefined data amount threshold is less than the total amount of data included in the first data object.

Specifically, if the second network node receives N1 second transport layer protocol data packets carrying data included in the first data object sent by the third network node through the second transport layer protocol connection, and the amount of data included in the first data object carried by the N1 second transport layer protocol data packets is greater than or equal to a predefined data amount threshold, the second network node may, before receiving next transport layer protocol data packet carrying data included in the first data object sent by the third network node, de-encapsulate the N1 second transport layer protocol data packets, to obtain the data included in the first data object carried by the N1 second transport layer protocol data packets, encapsulate the data included in the first data object obtained from the N1 second transport layer protocol data packets into one or more first transport layer protocol data packets, and according to the recorded mapping relationship between the first transport layer protocol connection and the second transport layer protocol connection, send the one or more first transport layer protocol data packets to the first network node through the first transport layer protocol connection having a mapping relationship with the second transport layer protocol connection, wherein the first transport layer protocol data packets carry the data included in the first data object carried by the N1 second transport layer protocol data packets received, wherein the N1 is a positive integer.

The second network node may encapsulate data included in the first data object obtained from one second transport layer protocol data packet into one or more first transport layer protocol data packets, and the second network node may also encapsulate data included in the first data object obtained from multiple second transport layer protocol data packets into one or more first transport layer protocol data packets. The second network node may determine the size of the first transport layer protocol data packets according to a current network status of the first transport layer protocol connection between the second network node and the first network node.

In some embodiments of the present application, the first network node, the second network node and the third network node may all be back-to-source servers in a CDN. Certainly, the first network node, the second network node and the third network node may also be network nodes in other networks.

It may be seen that, after a second network node as a transit network node receives a first download request for a first data object sent by a first network node through a first transport layer protocol connection between the first network node and the second network node, if finding that the second network node has not locally stored the first data object, the second network node establishes a second transport layer protocol connection to a third network node, sends a download request for the first data object to the third network node through the second transport layer protocol connection, and records a mapping relationship between the first transport layer protocol connection and the second transport layer protocol connection. As the second network node as a transit network node establishes the mapping relationship between the first transport layer protocol connection and the second transport layer protocol connection, when N1 second transport layer protocol data packets carrying data included in the first data object sent by the third network node are received, and the amount of data included in the first data object carried by the N1 second transport layer protocol data packets is greater than or equal to a predefined data amount threshold, the second network node, before receiving next transport layer protocol data packet carrying data included in the first data object sent by the third network node, sends first transport layer protocol data packets carrying data included in the first data object to the first network node directly through the first transport layer protocol connection having a mapping relationship with the second transport layer protocol connection, and in the mechanism, as the first data object may need to be carried through multiple transport layer protocol data packets, the second network node as a transit network node does not need to wait after complete first data object is received (that is, it is unnecessary to wait after all transport layer protocol data packets carrying the data of first data object are received) and then return the complete first data object to the first network node, but adopts a similar asynchronous manner to step by step forward data included in the first object data carried by transport layer protocol data packets from the third network node to the first network node through the transport layer protocol data packets, this is favorable for greatly reducing time in which the transit network node waits to receive the transport layer protocol data packets for carrying the first data object, favorable for greatly reducing time in which the data included in the first data object is transferred from the third network node to the first network node, and favorable for reducing transmission delay between a data source of the first data object and a request-starting network node of the first data object, and by greatly reducing the delay, it is favorable for enhancing user product experience.

It may be understood that, when transmitting the first data object, the first network node may be regarded as a downstream network node of the second network node, the second network node is a downstream network node of the third network node, if the first network node is a request-starting network node of the first data object, the second network node may be regarded as a transit network node, and the third network node may be a data source or a transit network node. In this embodiment of the present application, there may be one or more transit network nodes including the second network node between the data source and the request-starting network node of the first data object.

If the first network node is also a transit network node, before a second network node receives a first download request for a first data object sent by a first network node through a first transport layer protocol connection between the first network node and the second network node, the first network node may receive a download request for the first data object sent by a fourth network node through a third transport layer protocol connection between the first network node and the fourth network node (the fourth network node may be a request-starting network node, and may also be another transit network node), and records a mapping relationship between the third transport layer protocol connection and the first transport layer protocol connection. If the first network node receives N1 first transport layer protocol data packets carrying data included in the first data object sent by the second network node through the first transport layer protocol connection, and the amount of data included in the first data object carried by the N1 first transport layer protocol data packets is greater than or equal to a predefined data amount threshold, the first network node, before receiving a next first transport layer protocol data packet carrying data included in the first data object sent by the second network node, according to the recorded mapping relationship between the first transport layer protocol connection and the third transport layer protocol connection, determines the third transport layer protocol connection having a mapping relationship with the first transport layer protocol connection, and sends one or more third transport layer protocol data packets to the fourth network node through the determined third transport layer protocol connection having a mapping relationship with the first transport layer protocol connection. The one or more third transport layer protocol data packets carry the data included in the first data object carried by the N1 first transport layer protocol data packets received.

The first network node may encapsulate data included in the first data object obtained from one first transport layer protocol data packet into one or more third transport layer protocol data packets, and the first network node may also encapsulate data included in the first data object obtained from multiple first transport layer protocol data packets into one or more third transport layer protocol data packets. The first network node may determine the size of the third transport layer protocol data packets according to a current network status of the third transport layer protocol connection between the first network node and the fourth network node.

Similarly, if the third network node is also a transit network node, after the third network node receives the download request for the first data object sent by the second network node through the second transport layer protocol connection, the third network node may establish a fourth transport layer protocol connection between the third network node and a fifth network node (the fifth network node may be a data source of the first data object, and may also be another transit network node), send a download request for the first data object to the fifth network node through the fourth transport layer protocol connection, and record a mapping relationship between the second transport layer protocol connection and the fourth transport layer protocol connection. If the third network node receives N1 fourth transport layer protocol data packets carrying data included in the first data object sent by the fifth network node through the fourth transport layer protocol connection, and the amount of data included in the first data object carried by the N1 fourth transport layer protocol data packets is greater than or equal to a predefined data amount threshold, the third network node, before receiving a next fourth transport layer protocol data packet carrying data included in the first data object sent by the fifth network node, according to the recorded mapping relationship between the second transport layer protocol connection and the fourth transport layer protocol connection, determines the second transport layer protocol connection having a mapping relationship with the fourth transport layer protocol connection, and sends at least one second transport layer protocol data packet to the second network node through the determined second transport layer protocol connection having a mapping relationship with the fourth transport layer protocol connection. The at least one second transport layer protocol data packet carries the data included in the first data object carried by the N1 fourth transport layer protocol data packets received.

The third network node may encapsulate data included in the first data object obtained from one fourth transport layer protocol data packet into one or more second transport layer protocol data packets, and the third network node may also encapsulate data included in the first data object obtained from multiple fourth transport layer protocol data packets into one or more second transport layer protocol data packets. The third network node may determine the size of the third transport layer protocol data packets according to a current network status of the second transport layer protocol connection between the third network node and the second network node.

It may be seen that various transit network nodes between the data source and the request-starting network node may perform data transfer operations in a manner similar to that of the second network node.

In some embodiments of the present application, the first transport layer protocol connection may be a first TCP connection or a first UDP connection. That a second network node receives a first download request for a first data object sent by a first network node through a first transport layer protocol connection between the first network node and the second network node may include: the second network node receiving a download request for a first data object sent by a first network node through a first TCP connection or a first UDP connection between the first network node and the second network node.

In some embodiments of the present application, the second transport layer protocol connection may be a second UDP connection or a second TCP connection. The establishing a second transport layer protocol connection between the second network node and a third network node may include: establishing a second UDP connection or a second TCP connection between the second network node and a third network node.

In some embodiments of the present application, the first data object is a file or file fragment (the file fragment refers to one or more slices of a file).

In some embodiments of the present application, the data transmission acceleration method may further include: if the first network node is a request-starting network node of the first data object, the first network node, after receiving N transport layer protocol data packets (that is, N first transport layer protocol data packets) carrying data included in the first data object sent by the second network node through the first transport layer protocol connection, may utilize the data included in the first data object carried by the N transport layer protocol data packets for integrity check on the first data object.

It may be understood that the data source of the first data object may return the total number of the first data object to the request-starting network node through an application layer message (certainly, the request-starting network node may also know the total number of the first data object in another manner), therefore, the request-starting network node may de-encapsulate the received N transport layer protocol data packets to obtain the data included in the first data object carried by the N transport layer protocol data packets, accumulate the amount of data included in the first data object carried by the N transport layer protocol data packets, and check integrity of the first data object by comparing whether the total number of the first data object is equal to the accumulated data amount, wherein the N is a positive integer.

To facilitate better understanding and implementation of the embodiments of the present application, some specific application scenarios are exemplified below for description.

Figure 2:
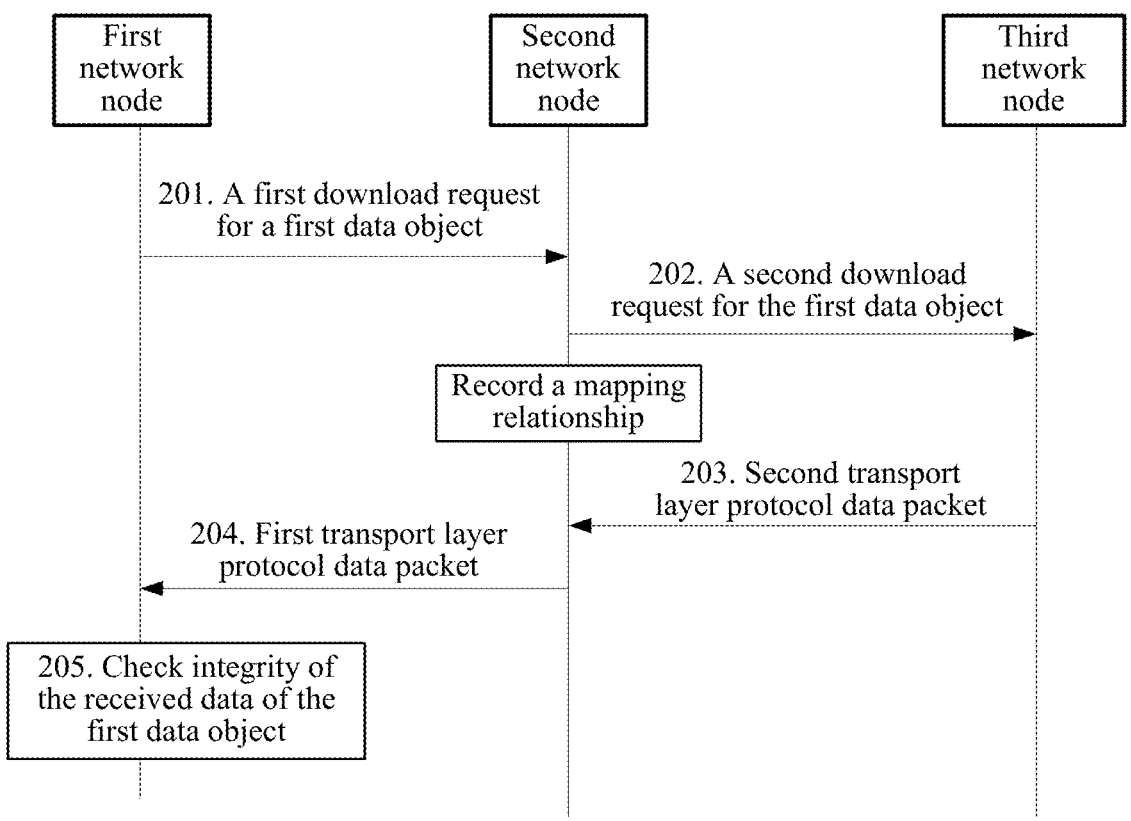
FIG. 2 is a schematic view of a flow of a data transmission acceleration method according to an embodiment of the present application.

FIG. 2 is a schematic view of a flow chart of another data transmission acceleration method according to another embodiment of the present application. This embodiment mainly takes that there is only one transit network node (that is, a second network node) between a data source and a request-starting network node of a first data object as an example for description. The other data transmission acceleration method according to another embodiment of the present application may include the following content.

201. A first network node establishes a first transport layer protocol connection between the first network node and a second network node, and the first network node sends a first download request for a first data object to the second network node through the first transport layer protocol connection between the first network node and the second network node.

In this embodiment, the first network node is taken as a request-starting network node of the first data object, and the first network node initiates a process of a download request for the first data object. The download request may carry identification and other information of the first data object.

The first transport layer protocol connection may be a first UDP connection or a first TCP connection or another transport layer protocol connection.

202. The second network node receives the first download request for a first data object sent by the first network node through the first transport layer protocol connection between the first network node and the second network node, and the second network node detects whether the first data object is locally stored (this embodiment takes that the second network node detects that the first data object is not locally stored as an example).

If the second network node has not locally stored the first data object, the second network node establishes a second transport layer protocol connection to a third network node, and sends a second download request for the first data object to the third network node through the second transport layer protocol connection. The second network node records a mapping relationship between the first transport layer protocol connection and the second transport layer protocol connection.

In some embodiments of the present application, the step of recording a mapping relationship between the first transport layer protocol connection and the second transport layer protocol connection may include: generating a mapping relationship record for recording the mapping relationship between the first transport layer protocol connection and the second transport layer protocol connection, wherein the mapping relationship record includes a first protocol field and a second protocol field, wherein the first protocol field may record identification of the first transport layer protocol connection, and the second protocol field may record identification of the second transport layer protocol connection. The mapping relationship record may further include a timestamp field, wherein the timestamp field may record time of receiving a download request for a first data object sent by a first network node through a first transport layer protocol connection between the first network node and the second network node, or the timestamp field may record time of establishing a second transport layer protocol connection between the second network node and a third network node, or the timestamp field may record time of sending a download request for the first data object to the third network node through the second transport layer protocol connection, or the timestamp field may record time of generating the mapping relationship record or the like. Certainly, the mapping relationship record may further include fields recording other information.

203. The third network node receives the download request for the first data object sent by the second network node through the second transport layer protocol connection, herein, suppose the third network node detects that the first data object is locally stored, the third network node may encapsulate data included in the first data object to N1 second transport layer protocol data packets (wherein each of the N1 second transport layer protocol data packets carries part of the data included in the first data, that is, the N1 second transport layer protocol data packets jointly carry all the data of the first data object, and the third network node sends the N1 second transport layer protocol data packets to the first network node through the second transport layer protocol connection.

204. If the second network node receives the N1 second transport layer protocol data packets carrying the data included in the first data object sent by the third network node through the second transport layer protocol connection, and the amount of data included in the first data object carried by the N1 second transport layer protocol data packets is greater than or equal to a predefined data amount threshold, the second network node, before receiving next transport layer protocol data packet carrying data included in the first data object sent by the third network node, de-encapsulates the N1 second transport layer protocol data packets, to obtain the data included in the first data object carried by the N1 second transport layer protocol data packets, and encapsulates the data included in the first data object obtained from the N1 second transport layer protocol data packets into at least one first transport layer protocol data packet.

The second network node may determine the first transport layer protocol connection having a mapping relationship with the second transport layer protocol connection according to the recorded mapping relationship between the first transport layer protocol connection and the second transport layer protocol connection, and the second network node sends the first transport layer protocol data packet to the first network node through the determined first transport layer protocol connection having a mapping relationship with the second transport layer protocol connection.

It may be understood that, as the second network node may re-encapsulate the N1 second transport layer protocol data packets received from the third network node, the second network node may re-encapsulate the data included in the first data object carried by the N1 second transport layer protocol data packets into N first transport layer protocol data packets, wherein N1 may be greater than, less than or equal to N. For example, the second network node may encapsulate data included in the first data object obtained from one second transport layer protocol data packet into one or more first transport layer protocol data packets, and the second network node may also encapsulate data included in the first data object obtained from multiple second transport layer protocol data packets into one or more first transport layer protocol data packets. The second network node may determine the size of the first transport layer protocol data packets according to a current network status of the first transport layer protocol connection between the second network node and the first network node.

205. The first network node receives transport layer protocol data packets carrying data included in the first data object sent by the second network node through the first transport layer protocol connection.

The first network node, after receiving N transport layer protocol data packets carrying data included in the first data object sent by the second network node through the first transport layer protocol connection, may utilize the data included in the first data object carried by the N transport layer protocol data packets for integrity check on the first data object.

It may be understood that the data source (that is, the third network node) of the first data object may return the total number of the first data object to the request-starting network node (that is, the first network node) through an application layer message (certainly, the request-starting network node may also know the total number of the first data object in another manner), therefore, the request-starting network node may de-encapsulate the received N transport layer protocol data packets to obtain the data included in the first data object carried by the N transport layer protocol data packets, accumulate the amount of data included in the first data object carried by the N transport layer protocol data packets, and check integrity of the first data object by comparing whether the total number of the first data object is equal to the accumulated data amount, wherein the N is a positive integer.

In some embodiments of the present application, the second transport layer protocol connection may be a second UDP connection or a second TCP connection. The establishing a second transport layer protocol connection between the second network node and a third network node may include: establishing a second UDP connection or a second TCP connection between the second network node and a third network node.

In some embodiments of the present application, the first data object is a file or file fragment (the file fragment refers to one or more slices of a file).

In some embodiments of the present application, the predefined data amount threshold is greater than or equal to the amount of data included in the first data object carried by any one first transport layer protocol data packet that the second network node has sent to the first network node; or the predefined data amount threshold is greater than or equal to an average size of the amount of data included in the first data object carried by N2 first transport layer protocol data packets that the second network node has sent to the first network node, wherein the N2 is a positive integer; or the predefined data amount threshold is greater than or equal to the maximum or minimum amount of data included in the first data object carried by first transport layer protocol data packets that the second network node has sent to the first network node; or the predefined data amount threshold is greater than or equal to the maximum or minimum amount of data included in the first data object that could be carried by first transport layer protocol data packets that the second network node has sent to the first network node; or the predefined data amount threshold is greater than or equal to the amount of data included in the first data object carried by any one second transport layer protocol data packet received from the third network node by the second network node; or the predefined data amount threshold is greater than or equal to an average size of the amount of data included in the first data object carried by N3 second transport layer protocol data packets received from the third network node by the second network node, wherein the N3 is a positive integer; or the predefined data amount threshold is greater than or equal to an average size of the amount of data included in the first data object carried by all second transport layer protocol data packets received from the third network node by the second network node; or the predefined data amount threshold is greater than or equal to the maximum or minimum amount of data included in the first data object carried by second transport layer protocol data packets received from the third network node by the second network node; or the predefined data amount threshold is greater than or equal to 0 byte.

Certainly, the predefined data amount threshold may also be another preset value, and of course, the predefined data amount threshold is less than the total amount of data included in the first data object.

In some embodiments of the present application, the predefined data amount threshold is greater than or equal to the amount of data included in the first data object carried by any one first transport layer protocol data packet that the second network node has sent to the first network node; or the predefined data amount threshold is greater than or equal to an average size of the amount of data included in the first data object carried by N2 first transport layer protocol data packets that the second network node has sent to the first network node, wherein the N2 is a positive integer; or the predefined data amount threshold is greater than or equal to the maximum or minimum amount of data included in the first data object carried by first transport layer protocol data packets that the second network node has sent to the first network node; or the predefined data amount threshold is greater than or equal to the maximum or minimum amount of data included in the first data object that could be carried by first transport layer protocol data packets that the second network node has sent to the first network node; or the predefined data amount threshold is greater than or equal to the amount of data included in the first data object carried by any one second transport layer protocol data packet received from the third network node by the second network node; or the predefined data amount threshold is greater than or equal to an average size of the amount of data included in the first data object carried by N3 second transport layer protocol data packets received from the third network node by the second network node, wherein the N3 is a positive integer; or the predefined data amount threshold is greater than or equal to an average size of the amount of data included in the first data object carried by all second transport layer protocol data packets received from the third network node by the second network node; or the predefined data amount threshold is greater than or equal to the maximum or minimum amount of data included in the first data object carried by second transport layer protocol data packets received from the third network node by the second network node; or the predefined data amount threshold is greater than or equal to 0 byte.

Certainly, the predefined data amount threshold may also be another preset value, and of course, the predefined data amount threshold is less than the total amount of data included in the first data object.

It may be seen that, in the solution of this embodiment, after a second network node as a transit network node receives a first download request for a first data object sent by a first network node through a first transport layer protocol connection between the first network node and the second network node, if finding that the second network node has not locally stored the first data object, the second network node establishes a second transport layer protocol connection to a third network node, sends a download request for the first data object to the third network node through the second transport layer protocol connection, and records a mapping relationship between the first transport layer protocol connection and the second transport layer protocol connection. As the second network node as a transit network node establishes the mapping relationship between the first transport layer protocol connection and the second transport layer protocol connection, when N1 second transport layer protocol data packets carrying data included in the first data object sent by the third network node are received, and the amount of data included in the first data object carried by the N1 second transport layer protocol data packets is greater than or equal to a predefined data amount threshold, the second network node, before receiving next transport layer protocol data packet carrying data included in the first data object sent by the third network node, sends first transport layer protocol data packets carrying data included in the first data object to the first network node directly through the first transport layer protocol connection having a mapping relationship with the second transport layer protocol connection, and in the mechanism, as the first data object may need to be carried through multiple transport layer protocol data packets, the second network node as a transit network node does not need to wait after complete first data object is received (that is, it is unnecessary to wait after all transport layer protocol data packets carrying the data of first data object are received) and then return the complete first data object to the first network node, but adopts a similar asynchronous manner to step by step forward data included in the first object data carried by transport layer protocol data packets from the third network node to the first network node through the transport layer protocol data packets, this is favorable for greatly reducing time in which the transit network node waits to receive the transport layer protocol data packets for carrying the first data object, favorable for greatly reducing time in which the data included in the first data object is transferred from the third network node to the first network node, and favorable for reducing transmission delay between a data source of the first data object and a request-starting network node of the first data object, and by greatly reducing the delay, it is favorable for enhancing user product experience.

Figure 3A:
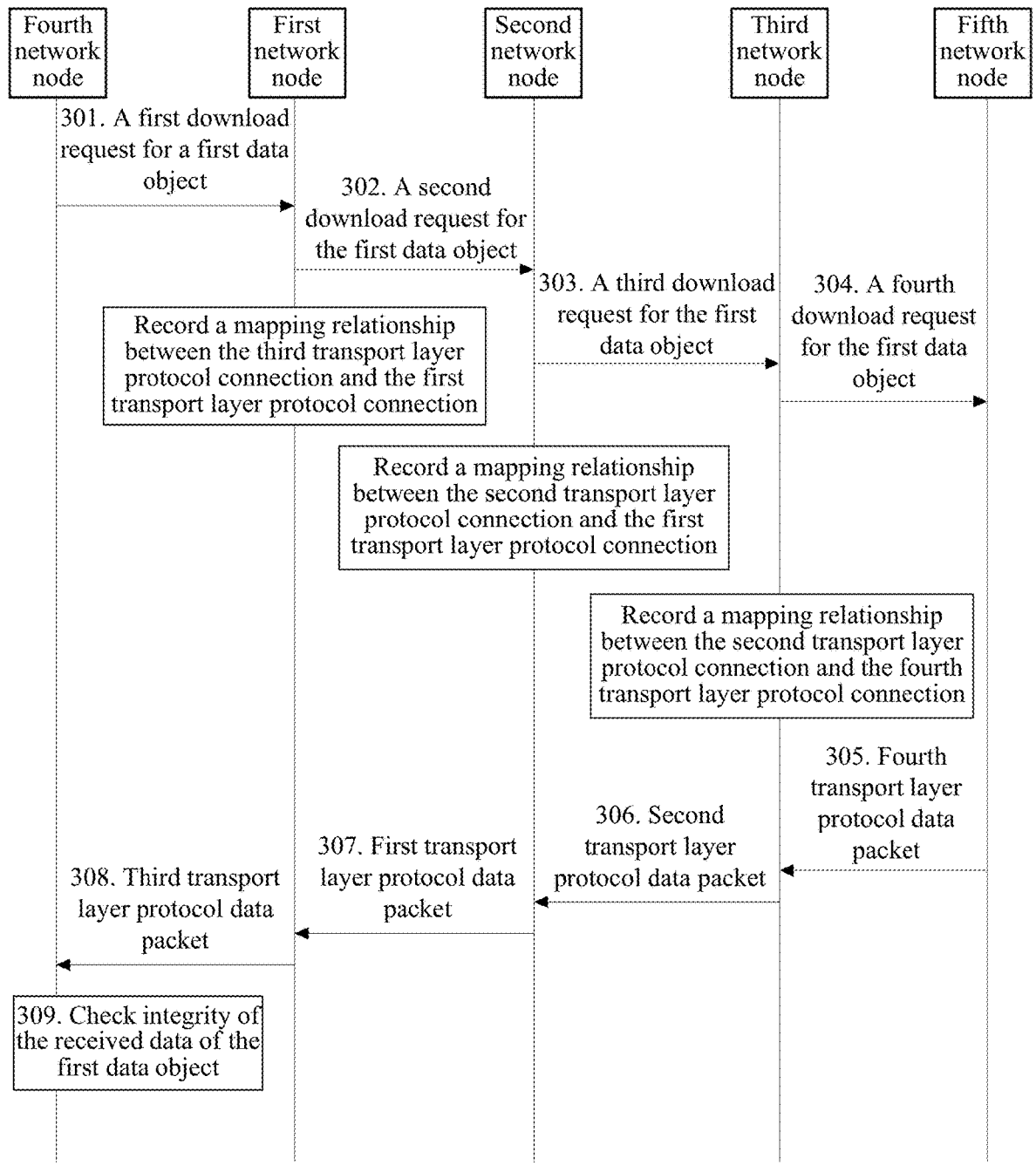
FIG. 3A is a schematic view of a flow of a data transmission acceleration method according to an embodiment of the present application.

FIG. 3A is a schematic view of a yet another data transmission acceleration method according to a yet another embodiment of the present application. This embodiment mainly takes a scenario where there are multiple transit network nodes (that is, a first network node, a second network node and a third network node) between a data source and a request-starting network node of the first data object as an example for description. As shown in FIG. 3A, the yet another data transmission acceleration method according to a yet another embodiment of the present application may include the following content.

301. A fourth network node establishes a third transport layer protocol connection between a first network node and the fourth network node, and the fourth network node sends a first download request for a first data object to the first network node through the third transport layer protocol connection between the first network node and the fourth network node.

In this embodiment, the fourth network node is taken as a request-starting network node of the first data object, and the fourth network node initiates a process of a download request for the first data object. The download request may carry identification and other information of the first data object.

The third transport layer protocol connection may be a third UDP connection or a third TCP connection or another transport layer protocol connection.

302. The first network node receives the first download request for a first data object sent by the fourth network node through the third transport layer protocol connection between the first network node and the fourth network node, and the first network node detects whether the first data object is locally stored (this embodiment takes that the first network node detects that the first data object is not locally stored as an example).

If the first network node has not locally stored the first data object, the first network node establishes a first transport layer protocol connection between a second network node and the first network node, sends a second download request for the first data object to the second network node through the first transport layer protocol connection, and records a mapping relationship between the first transport layer protocol connection and the third transport layer protocol connection.

In some embodiments of the present application, the step that the first network node records a mapping relationship between the first transport layer protocol connection and the third transport layer protocol connection may include: the first network node generating a mapping relationship record for recording the mapping relationship between the first transport layer protocol connection and the third transport layer protocol connection, wherein the mapping relationship record includes a first protocol field and a second protocol field, wherein the first protocol field may record identification of the first transport layer protocol connection, and the second protocol field may record identification of the third transport layer protocol connection. The mapping relationship record may further include a timestamp field, wherein the timestamp field may record time in which the first network node receives the download request for a first data object sent by the fourth network node through the third transport layer protocol connection between the fourth network node and the first network node, or the timestamp field may record time of establishing a first transport layer protocol connection between the first network node and a second network node, or the timestamp field may record time of sending a download request for the first data object to the second network node through the first transport layer protocol connection, or the timestamp field may record time of generating the mapping relationship record or the like. Certainly, the mapping relationship record may further include fields recording other information.

Certainly, the first transport layer protocol connection may be a first UDP connection or a first TCP connection or another transport layer protocol connection.

303. The second network node receives the download request for the first data object sent by the first network node through the first transport layer protocol connection between the first network node and the second network node, and the second network node detects whether the first data object is locally stored (this embodiment takes that the second network node detects that the first data object is not locally stored as an example).

If the second network node has not locally stored the first data object, the second network node establishes a second transport layer protocol connection to a third network node, sends a third download request for the first data object to the third network node through the second transport layer protocol connection, and records a mapping relationship between the first transport layer protocol connection and the second transport layer protocol connection.

In some embodiments of the present application, the step that the second network node records a mapping relationship between the first transport layer protocol connection and the second transport layer protocol connection may include: the second network node generating a mapping relationship record for recording the mapping relationship between the first transport layer protocol connection and the second transport layer protocol connection, wherein the mapping relationship record includes a first protocol field and a second protocol field, wherein the first protocol field may record identification of the first transport layer protocol connection, and the second protocol field may record identification of the second transport layer protocol connection. The mapping relationship record may further include a timestamp field, wherein the timestamp field may record time in which the second network node receives the download request for a first data object sent by the first network node through the first transport layer protocol connection between the first network node and the second network node, or the timestamp field may record time of establishing a second transport layer protocol connection between the second network node and a third network node, or the timestamp field may record time of sending a download request for the first data object to the third network node through the second transport layer protocol connection, or the timestamp field may record time of generating the mapping relationship record or the like. Certainly, the mapping relationship record may further include fields recording other information.

304. The third network node receives the download request for the first data object sent by the second network node through the second transport layer protocol connection between the third network node and the second network node, and the third network node detects whether the first data object is locally stored (this embodiment takes that the third network node detects that the first data object is not locally stored as an example).

If the third network node has not locally stored the first data object, the third network node establishes a fourth transport layer protocol connection between a fifth network node and the third network node, sends a fourth download request for the first data object to the fifth network node through the fourth transport layer protocol connection, and records a mapping relationship between the second transport layer protocol connection and the fourth transport layer protocol connection.

In some embodiments of the present application, the step that the third network node records a mapping relationship between the fourth transport layer protocol connection and the second transport layer protocol connection may include: the third network node generating a mapping relationship record for recording the mapping relationship between the fourth transport layer protocol connection and the second transport layer protocol connection, wherein the mapping relationship record includes a first protocol field and a second protocol field, wherein the first protocol field may record identification of the fourth transport layer protocol connection, and the second protocol field may record identification of the second transport layer protocol connection. The mapping relationship record may further include a timestamp field, wherein the timestamp field may record time in which the third network node receives the download request for a first data object sent by the second network node through the second transport layer protocol connection between the third network node and the second network node, or the timestamp field may record time of establishing a fourth transport layer protocol connection between the fifth network node and the third network node, or the timestamp field may record time of sending the download request for the first data object sent to the fifth network node through the fourth transport layer protocol connection, or the timestamp field may record time of generating the mapping relationship record or the like. Certainly, the mapping relationship record may further include fields recording other information.

305. The fifth network node receives the download request for the first data object sent by the third network node through the fourth transport layer protocol connection between the third network node and the fifth network node, and the fifth network node detects whether the first data object is locally stored (this embodiment takes that the fifth network node detects that the first data object is locally stored as an example). The fifth network node encapsulates data included in the first data object to N2 fourth transport layer protocol data packets (wherein each of the N2 fourth transport layer protocol data packets carries part of the data included in the first data, that is, the N2 fourth transport layer protocol data packets jointly carry all the data of the first data object), and sends the N2 fourth transport layer protocol data packets to the third network node through the fourth transport layer protocol connection.

306. If the third network node receives N1 fourth transport layer protocol data packets carrying data included in the first data object sent by the fifth network node through the fourth transport layer protocol connection, and the amount of data included in the first data object carried by the N1 fourth transport layer protocol data packets is greater than or equal to a predefined data amount threshold, the third network node, before receiving a next fourth transport layer protocol data packet carrying data included in the first data object sent by the fifth network node, de-encapsulates the N1 fourth transport layer protocol data packets, to obtain the data included in the first data object carried by the N1 fourth transport layer protocol data packets, and encapsulates the data included in the first data object obtained from the N1 fourth transport layer protocol data packets into second transport layer protocol data packets.

The third network node may determine the second transport layer protocol connection having a mapping relationship with the fourth transport layer protocol connection according to the recorded mapping relationship between the second transport layer protocol connection and the fourth transport layer protocol connection, and send the second transport layer protocol data packets to the second network node through the determined second transport layer protocol connection having a mapping relationship with the fourth transport layer protocol connection.

It may be understood that, as the third network node may re-encapsulate the N2 fourth transport layer protocol data packets received from the fifth network node, the third network node may re-encapsulate data included in the first data object carried by the N2 fourth transport layer protocol data packets into N1 second transport layer protocol data packets, wherein N1 may be greater than, less than or equal to N2. For example, the third network node may encapsulate data included in the first data object obtained from one fourth transport layer protocol data packet into one or more second transport layer protocol data packets, and the third network node may also encapsulate data included in the first data object obtained from multiple fourth transport layer protocol data packets into one or more second transport layer protocol data packets. The third network node may determine the size of the second transport layer protocol data packets according to a current network status of the second transport layer protocol connection between the second network node and the third network node.

307. If the second network node receives N1 second transport layer protocol data packets carrying data included in the first data object sent by the third network node through the second transport layer protocol connection, and the amount of data included in the first data object carried by the N1 second transport layer protocol data packets is greater than or equal to a predefined data amount threshold, the second network node may, before receiving next transport layer protocol data packet carrying data included in the first data object sent by the third network node, de-encapsulate the N1 second transport layer protocol data packets, to obtain the data included in the first data object carried by the N1 second transport layer protocol data packets, and encapsulate the data included in the first data object obtained from the second transport layer protocol data packets into first transport layer protocol data packets.

The second network node may determine the first transport layer protocol connection having a mapping relationship with the second transport layer protocol connection according to the recorded mapping relationship between the first transport layer protocol connection and the second transport layer protocol connection, and the second network node sends the first transport layer protocol data packets to the first network node through the determined first transport layer protocol connection having a mapping relationship with the second transport layer protocol connection.

It may be understood that, as the second network node may re-encapsulate the N1 second transport layer protocol data packets received from the third network node, the second network node may re-encapsulate the data included in the first data object carried by the N1 second transport layer protocol data packets into N first transport layer protocol data packets, wherein N1 may be greater than, less than or equal to N. For example, the second network node may encapsulate data included in the first data object obtained from one second transport layer protocol data packet into one or more first transport layer protocol data packets, and the second network node may also encapsulate data included in the first data object obtained from multiple second transport layer protocol data packets into one or more first transport layer protocol data packets. The second network node may determine the size of the first transport layer protocol data packets according to a current network status of the first transport layer protocol connection between the second network node and the first network node.

308. If the first network node receives N1 first transport layer protocol data packets carrying data included in the first data object sent by the second network node through the first transport layer protocol connection, and the amount of data included in the first data object carried by the N1 first transport layer protocol data packets is greater than or equal to a predefined data amount threshold, the first network node, before receiving a next first transport layer protocol data packet carrying data included in the first data object sent by the second network node, de-encapsulates the N1 first transport layer protocol data packets, to obtain the data included in the first data object carried by the N1 first transport layer protocol data packets, and encapsulates the data included in the first data object obtained from the N1 first transport layer protocol data packets into third transport layer protocol data packets.

In some embodiments of the present application, the predefined data amount threshold is greater than or equal to the amount of data included in the first data object carried by any one first transport layer protocol data packet that the second network node has sent to the first network node; or the predefined data amount threshold is greater than or equal to an average size of the amount of data included in the first data object carried by N2 first transport layer protocol data packets that the second network node has sent to the first network node, wherein the N2 is a positive integer; or the predefined data amount threshold is greater than or equal to the maximum or minimum amount of data included in the first data object carried by first transport layer protocol data packets that the second network node has sent to the first network node; or the predefined data amount threshold is greater than or equal to the maximum or minimum amount of data included in the first data object that could be carried by first transport layer protocol data packets that the second network node has sent to the first network node; or the predefined data amount threshold is greater than or equal to the amount of data included in the first data object carried by any one second transport layer protocol data packet received from the third network node by the second network node; or the predefined data amount threshold is greater than or equal to an average size of the amount of data included in the first data object carried by N3 second transport layer protocol data packets received from the third network node by the second network node, wherein the N3 is a positive integer; or the predefined data amount threshold is greater than or equal to an average size of the amount of data included in the first data object carried by all second transport layer protocol data packets received from the third network node by the second network node; or the predefined data amount threshold is greater than or equal to the maximum or minimum amount of data included in the first data object carried by second transport layer protocol data packets received from the third network node by the second network node; or the predefined data amount threshold is greater than or equal to 0 byte.

Certainly, the predefined data amount threshold may also be another preset value, and of course, the predefined data amount threshold is less than the total amount of data included in the first data object.

The first network node may determine the third transport layer protocol connection having a mapping relationship with the first transport layer protocol connection according to the recorded mapping relationship between the first transport layer protocol connection and the third transport layer protocol connection, and the first network node sends the third transport layer protocol data packets to the fourth network node through the determined third transport layer protocol connection having a mapping relationship with the first transport layer protocol connection.

It may be understood that, as the first network node may re-encapsulate the N second transport layer protocol data packets received from the second network node, the first network node may re-encapsulate the data included in the first data object carried by the N first transport layer protocol data packets into N3 third transport layer protocol data packets, wherein N3 may be greater than, less than or equal to N. For example, the first network node may encapsulate data included in the first data object obtained from one first transport layer protocol data packet into one or more third transport layer protocol data packets, and the first network node may also encapsulate data included in the first data object obtained from multiple first transport layer protocol data packets into one or more third transport layer protocol data packets. The first network node may determine the size of the third transport layer protocol data packets according to a current network status of the third transport layer protocol connection between the fourth network node and the first network node.

309. The fourth network node receives third transport layer protocol data packets carrying data included in the first data object sent by the first network node through the third transport layer protocol connection.

The fourth network node, after receiving N4 third transport layer protocol data packets carrying data included in the first data object sent by the first network node through the third transport layer protocol connection, may utilize the data included in the first data object carried by the N4 third transport layer protocol data packets for integrity check on the first data object.

It may be understood that the data source (that is, the fifth network node) of the first data object may return the total number of the first data object to the request-starting network node (that is, the fourth network node) through an application layer message (certainly, the request-starting network node may also know the total number of the first data object in another manner), therefore, the request-starting network node may de-encapsulate the received N4 transport layer protocol data packets to obtain the data included in the first data object carried by the N4 transport layer protocol data packets, accumulate the amount of data included in the first data object carried by the N4 transport layer protocol data packets, and check integrity of the first data object by comparing whether the total number of the first data object is equal to the accumulated data amount, wherein the N4 is a positive integer.

This embodiment takes that all transit network nodes do not check integrity of the first data object as an example for description, however, in actual applications, some transit network nodes may be selected to check integrity of the first data object.

In some embodiments of the present application, the second transport layer protocol connection may be a second UDP connection or a second TCP connection. The establishing a second transport layer protocol connection between the second network node and a third network node may include: establishing a second UDP connection or a second TCP connection between the second network node and a third network node.

In some embodiments of the present application, the first data object is a file or file fragment (the file fragment refers to one or more slices of a file).

Figure 3B:
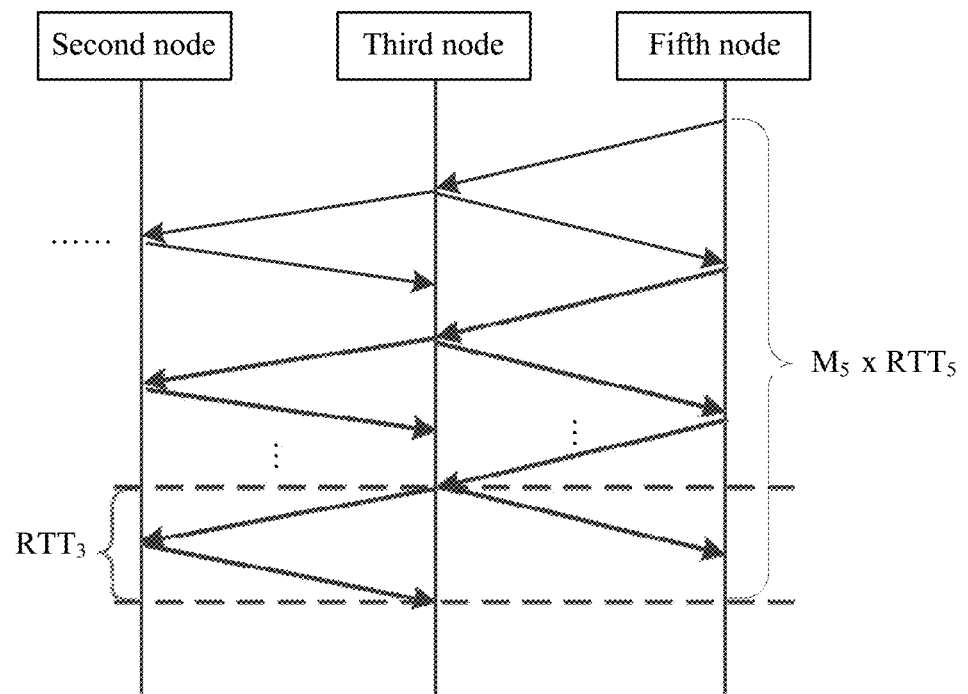
FIG. 3B is a schematic view of a delay of data transmission between network nodes according to an embodiment of the present application.

The solution in this embodiment of the present application reduces data transmission delay is described below with reference to FIG. 3B.

One Round-Trip Time (RTT) refers to an RTT in which one-time network transmission of one transport layer protocol data packet (for example, one TCP slice) is completed.

As shown in FIG. 3, suppose the fifth network node carries the first data object through N2 TCP slices (RTT5 indicates an RTT in which the fifth network node transmits each TCP slice), the time in which the fifth network node sends the N2 TCP slices to the third network node is N2*RTT5.

Similarly, suppose the third network node carries the first data object through N1 TCP slices (RTT3 indicates an RTT in which the third network node transmits each TCP slice), the time in which the third network node sends the N1 TCP slices to the second network node is N1*RTT3.

Therefore, the time of transmitting the first data object from the fifth network node to the third network node may be:

$$RTT5*(N2-0.5)+RTT3*0.5$$

It is expanded to a scenario of more network nodes, and suppose, a path of transmitting the first data object totally includes n network nodes, wherein the n network nodes are numbered 1, 2, ... n sequentially from a starting data request network node to a data source, a delay between the data source to the starting data request network node is about:

$$RTTx*(Mx-1) + 1/2*\sum_{k=2}^{n} RTT_k,$$

where RTTk denotes one RTT between a network node k and a network node k−1, Mk denotes the total number of TCP slices carrying the first data object transmitted between the network node k and the network node k−1, and the total number of TCP slices carrying the first data object transmitted between different network nodes may vary.

$k=2 \ldots n$. RTT$x$*($Mx$−1) is the maximum value in RTT$k$*($Mk$−1).

In view of the above, based on the solution in this embodiment of the present application, it is favorable for greatly reducing network delay of data transmission between multiple network nodes, and increase of network transmission delay with increase of the number of network nodes in a transmission path is reduced from O(n) in the conventional approach to about O(1).

It may be understood that, when transmitting the first data object, the first network node may be regarded as a downstream network node of the second network node, the second network node is a downstream network node of the third network node, if the first network node is a request-starting network node of the first data object, the second network node may be regarded as a transit network node, and the third network node may be a data source or a transit network node. In this embodiment of the present application, there may be one or more transit network nodes including the second network node between the data source and the request-starting network node of the first data object.

It may be seen that various transit network nodes between the data source and the request-starting network node may perform data transfer operations in a manner similar to that of the second network node.

In some embodiments of the present application, the first transport layer protocol connection may be a first TCP connection or a first UDP connection. That a second network node receives a first download request for a first data object sent by a first network node through a first transport layer protocol connection between the first network node and the second network node may include: the second network node receiving a download request for a first data object sent by a first network node through a first TCP connection or a first UDP connection between the first network node and the second network node.

It may be seen that, in the solution of this embodiment, after a second network node as a transit network node receives a first download request for a first data object sent by a first network node through a first transport layer protocol connection between the first network node and the second network node, if finding that the second network node has not locally stored the first data object, the second network node establishes a second transport layer protocol connection to a third network node, sends a download request for the first data object to the third network node through the second transport layer protocol connection, and records a mapping relationship between the first transport layer protocol connection and the second transport layer protocol connection. As the second network node as a transit network node establishes the mapping relationship between the first transport layer protocol connection and the second transport layer protocol connection, when N1 second transport layer protocol data packets carrying data included in the first data object sent by the third network node are received, and the amount of data included in the first data object carried by the N1 second transport layer protocol data packets is greater than or equal to a predefined data amount threshold, the second network node, before receiving next transport layer protocol data packet carrying data included in the first data object sent by the third network node, sends first transport layer protocol data packets carrying data included in the first data object to the first network node directly through the first transport layer protocol connection having a mapping relationship with the second transport layer protocol connection, and in the mechanism, as the first data object may need to be carried through multiple transport layer protocol data packets, the second network node as a transit network node does not need to wait after complete first data object is received (that is, it is unnecessary to wait after all transport layer protocol data packets carrying the data of first data object are received) and then return the complete first data object to the first network node, but adopts a similar asynchronous manner to step by step forward data included in the first object data carried by transport layer protocol data packets from the third network node to the first network node through the transport layer protocol data packets, this is favorable for greatly reducing time in which the transit network node waits to receive the transport layer protocol data packets for carrying the first data object, favorable for greatly reducing time in which the data included in the first data object is transferred from the third network node to the first network node, and favorable for reducing transmission delay between a data source of the first data object and a request-starting network node of the first data object, and by greatly reducing the delay, it is favorable for enhancing user product experience.

To facilitate better implementation of the solutions in the embodiments of the present application, related apparatuses for implementing the solutions are further provided below.

Figure 4:
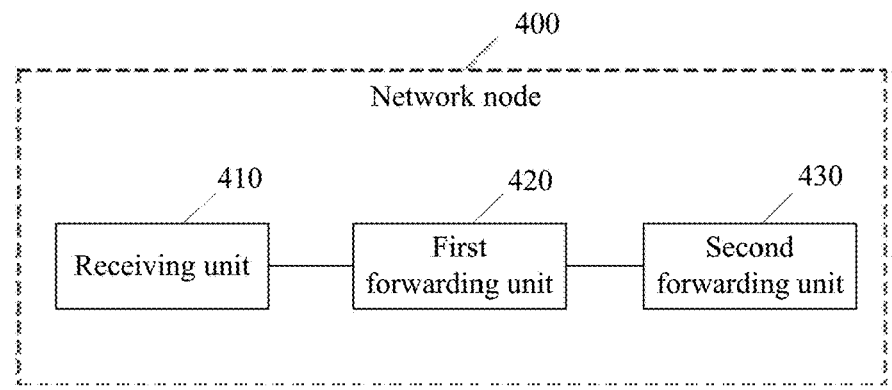
FIG. 4 is a schematic view of a data transmission apparatus according to an embodiment of the present application.

Referring to FIG. 4, an embodiment of the present application provides a data transmission apparatus 400, which may include: a receiving unit 410, a first forwarding unit 420 and a second forwarding unit 430.

The receiving unit 410 is used for receiving a download request for a first data object sent by a first network node through a first transport layer protocol connection between the first network node and the data transmission apparatus 400.

The first network node may be a request-starting network node (that is, initiate a download request for downloading the first data object), and the first network node may also be a transit network node between a data source and a request-starting network node.

The forwarding unit 420 is used for, if the data transmission apparatus has not locally stored the first data object, establishing a second transport layer protocol connection between the data transmission apparatus and a third network node, sending a download request for the first data object to the third network node through the second transport layer protocol connection, and recording a mapping relationship between the first transport layer protocol connection and the second transport layer protocol connection.

Transport layer protocols corresponding to the first transport layer protocol connection and the second transport layer protocol connection may be the same or different, for example, the transport layer protocol corresponding to the first transport layer protocol connection is a TCP, and the transport layer protocol corresponding to the second transport layer protocol connection is also a TCP. Alternatively, the transport layer protocol corresponding to the first transport layer protocol connection is a UDP, and the transport layer protocol corresponding to the second transport layer protocol connection is also a UDP. Alternatively, the transport layer protocol corresponding to the first transport layer protocol connection is a TCP, and the transport layer protocol corresponding to the second transport layer protocol connection is a UDP, or the transport layer protocol corresponding to the first transport layer protocol connection is a UDP, and the transport layer protocol corresponding to the second transport layer protocol connection is a TCP. Certainly, the transport layer protocols corresponding to the first transport layer protocol connection and the second transport layer protocol connection may be the same or different protocols.

In some embodiments of the present application, the step of recording a mapping relationship between the first transport layer protocol connection and the second transport layer protocol connection may include: generating a mapping relationship record for recording the mapping relationship between the first transport layer protocol connection and the second transport layer protocol connection, wherein the mapping relationship record includes a first protocol field and a second protocol field, wherein the first protocol field may record identification of the first transport layer protocol connection, and the second protocol field may record identification of the second transport layer protocol connection. The mapping relationship record may further include a timestamp field, wherein the timestamp field may record time of receiving a download request for a first data object sent by a first network node through a first transport layer protocol connection between the first network node and the data transmission apparatus, or the timestamp field may record time of establishing a second transport layer protocol connection between the data transmission apparatus and a third network node, or the timestamp field may record time of sending a download request for the first data object to the third network node through the second transport layer protocol connection, or the timestamp field may record time of generating the mapping relationship record or the like. Certainly, the mapping relationship record may further include other fields.

The second forwarding unit 430 is used for, if the receiving unit 410 receives N1 second transport layer protocol data packets carrying data included in the first data object sent by the third network node through the second transport layer protocol connection, and the amount of data included in the first data object carried by the N1 second transport layer protocol data packets is greater than or equal to a predefined data amount threshold, before receiving next transport layer protocol data packet carrying data included in the first data object sent by the third network node, according to the recorded mapping relationship between the first transport layer protocol connection and the second transport layer protocol connection, sending first transport layer protocol data packets to the first network node through the first transport layer protocol connection having a mapping relationship with the second transport layer protocol connection, wherein the first transport layer protocol data packets carry the data included in the first data object carried by the N1 second transport layer protocol data packets received, wherein the N1 is a positive integer.

In some embodiments of the present application, the second forwarding unit 430 may encapsulate data included in the first data object obtained from one second transport layer protocol data packet into one or more first transport layer protocol data packets, and the second forwarding unit 430 may also encapsulate data included in the first data object obtained from multiple second transport layer protocol data packets into one or more first transport layer protocol data packets. The second forwarding unit 430 may determine the size of the first transport layer protocol data packets according to a current network status of the first transport layer protocol connection between the data transmission apparatus 400 and the first network node.

In some embodiments of the present application, the receiving unit 410 may be specifically used for receiving a download request for a first data object sent by a first network node through a first TCP connection or a first UDP connection between the first network node and the data transmission apparatus 400.

In some embodiments of the present application, in the respect of establishing a second transport layer protocol connection between the data transmission apparatus 400 and a third network node, the forwarding unit 420 may be specifically used for establishing a second UDP connection or a second TCP connection between the data transmission apparatus 400 and a third network node.

In some embodiments of the present application, the first data object is a file or file fragment.

If the first network node is also a transit network node, before the data transmission apparatus 400 receives a first download request for a first data object sent by a first network node through a first transport layer protocol connection between the first network node and the data transmission apparatus 400, the first network node may receive a download request for the first data object sent by a fourth network node through a third transport layer protocol connection between the first network node and the fourth network node (the fourth network node may be a request-starting network node, and may also be another transit network node), and records a mapping relationship between the third transport layer protocol connection and the first transport layer protocol connection. If the first network node receives N1 first transport layer protocol data packets carrying data included in the first data object sent by the data transmission apparatus 400 through the first transport layer protocol connection, and the amount of data included in the first data object carried by the N1 first transport layer protocol data packets is greater than or equal to a predefined data amount threshold, the first network node, before receiving a next first transport layer protocol data packet carrying data included in the first data object sent by the data transmission apparatus 400, according to the recorded mapping relationship between the first transport layer protocol connection and the third transport layer protocol connection, determines the third transport layer protocol connection having a mapping relationship with the first transport layer protocol connection, and sends one or more third transport layer protocol data packets to the fourth network node through the determined third transport layer protocol connection having a mapping relationship with the first transport layer protocol connection. The one or more third transport layer protocol data packets carry the data included in the first data object carried by the N1 first transport layer protocol data packets received.

The first network node may encapsulate data included in the first data object obtained from one first transport layer protocol data packet into one or more third transport layer protocol data packets, and the first network node may also encapsulate data included in the first data object obtained from multiple first transport layer protocol data packets into one or more third transport layer protocol data packets. The first network node may determine the size of the third transport layer protocol data packets according to a current network status of the third transport layer protocol connection between the first network node and the fourth network node.

Similarly, if the third network node is also a transit network node, after the third network node receives the download request for the first data object sent by the data transmission apparatus 400 through the second transport layer protocol connection, the third network node may establish a fourth transport layer protocol connection between the third network node and a fifth network node (the fifth network node may be a data source of the first data object, and may also be another transit network node), send a download request for the first data object to the fifth network node through the fourth transport layer protocol connection, and record a mapping relationship between the second transport layer protocol connection and the fourth transport layer protocol connection. If the third network node receives N1 fourth transport layer protocol data packets carrying data included in the first data object sent by the fifth network node through the fourth transport layer protocol connection, and the amount of data included in the first data object carried by the N1 fourth transport layer protocol data packets is greater than or equal to a predefined data amount threshold, the third network node, before receiving a next fourth transport layer protocol data packet carrying data included in the first data object sent by the fifth network node, according to the recorded mapping relationship between the second transport layer protocol connection and the fourth transport layer protocol connection, determines the second transport layer protocol connection having a mapping relationship with the fourth transport layer protocol connection, and sends at least one second transport layer protocol data packet to the data transmission apparatus 400 through the determined second transport layer protocol connection having a mapping relationship with the fourth transport layer protocol connection. The at least one second transport layer protocol data packet carries the data included in the first data object carried by the N1 fourth transport layer protocol data packets received.

The third network node may encapsulate data included in the first data object obtained from one fourth transport layer protocol data packet into one or more second transport layer protocol data packets, and the third network node may also encapsulate data included in the first data object obtained from multiple fourth transport layer protocol data packets into one or more second transport layer protocol data packets. The third network node may determine the size of the second transport layer protocol data packets according to a current network status of the second transport layer protocol connection between the third network node and the data transmission apparatus 400.

In some embodiments of the present application, the predefined data amount threshold is greater than or equal to the amount of data included in the first data object carried by any one first transport layer protocol data packet that the second network node has sent to the first network node; or the predefined data amount threshold is greater than or equal to an average size of the amount of data included in the first data object carried by N2 first transport layer protocol data packets that the second network node has sent to the first network node, wherein the N2 is a positive integer; or the predefined data amount threshold is greater than or equal to the maximum or minimum amount of data included in the first data object carried by first transport layer protocol data packets that the second network node has sent to the first network node; or the predefined data amount threshold is greater than or equal to the maximum or minimum amount of data included in the first data object that could be carried by first transport layer protocol data packets that the second network node has sent to the first network node; or the predefined data amount threshold is greater than or equal to the amount of data included in the first data object carried by any one second transport layer protocol data packet received from the third network node by the second network node; or the predefined data amount threshold is greater than or equal to an average size of the amount of data included in the first data object carried by N3 second transport layer protocol data packets received from the third network node by the second network node, wherein the N3 is a positive integer; or the predefined data amount threshold is greater than or equal to an average size of the amount of data included in the first data object carried by all second transport layer protocol data packets received from the third network node by the second network node; or the predefined data amount threshold is greater than or equal to the maximum or minimum amount of data included in the first data object carried by second transport layer protocol data packets received from the third network node by the second network node; or the predefined data amount threshold is greater than or equal to 0 byte.

Certainly, the predefined data amount threshold may also be another preset value, and of course, the predefined data amount threshold is less than the total amount of data included in the first data object.

In some embodiments of the present application, if the first network node is a request-starting network node of the first data object, the first network node, after receiving N transport layer protocol data packets (that is, N first transport layer protocol data packets) carrying data included in the first data object sent by the data transmission apparatus through the first transport layer protocol connection, may utilize the data included in the first data object carried by the N transport layer protocol data packets for integrity check on the first data object.

It may be seen that, in the solution of this embodiment, after a data transmission apparatus 400 as a transit network node receives a first download request for a first data object sent by a first network node through a first transport layer protocol connection between the first network node and the data transmission apparatus 400, if finding that the data transmission apparatus 400 has not locally stored the first data object, the data transmission apparatus 400 establishes a second transport layer protocol connection between the data transmission apparatus 400 and a third network node, sends a download request for the first data object to the third network node through the second transport layer protocol connection, and records a mapping relationship between the first transport layer protocol connection and the second transport layer protocol connection. As the data transmission apparatus 400 as a transit network node establishes the mapping relationship between the first transport layer protocol connection and the second transport layer protocol connection, after receiving second transport layer protocol data packets carrying data included in the first data object sent by the third network node, the data transmission apparatus 400 sends first transport layer protocol data packets carrying data included in the first data object to the first network node directly through the first transport layer protocol connection having a mapping relationship with the second transport layer protocol connection, and in the mechanism, as the first data object may need to be carried through multiple transport layer protocol data packets, the data transmission apparatus 400 as a transit network node does not need to wait after complete first data object is received (that is, it is unnecessary to wait after all transport layer protocol data packets carrying the data of first data object are received) and then return the complete first data object to the first network node, but adopts a similar asynchronous manner to step by step forward data included in the first object data carried by transport layer protocol data packets from the third network node to the first network node through the transport layer protocol data packets, this is favorable for greatly reducing time in which the transit network node waits to receive the transport layer protocol data packets for carrying the first data object, favorable for greatly reducing time in which the data included in the first data object is transferred from the third network node to the first network node, and favorable for reducing transmission delay between a data source of the first data object and a request-starting network node of the first data object, and by greatly reducing the delay, it is favorable for enhancing user product experience.

Figure 5:
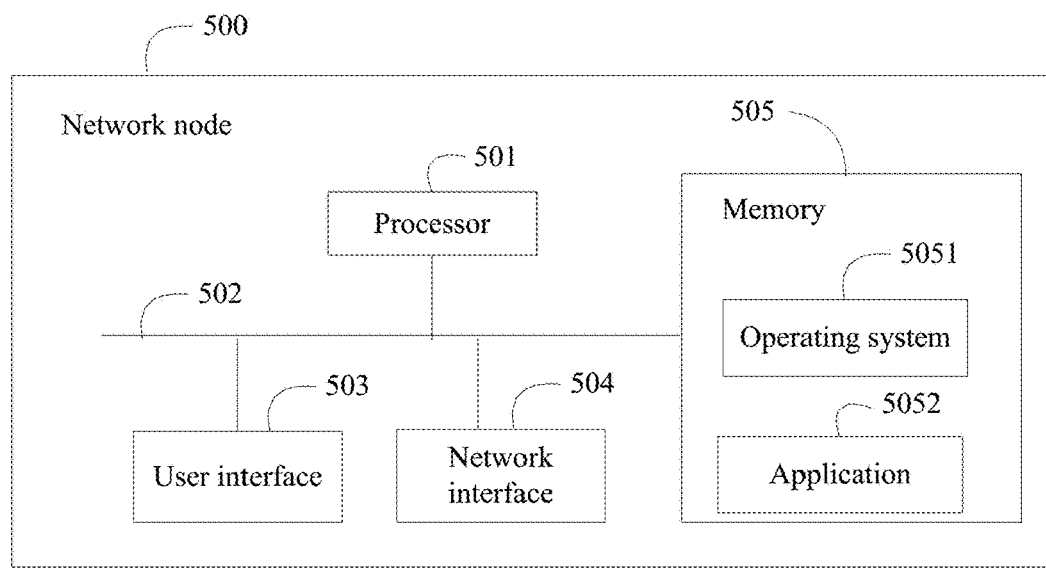
FIG. 5 is a schematic view of another data transmission apparatus according to an embodiment of the present application.

FIG. 5 is a structural block diagram of a data transmission apparatus 500 according to another embodiment of the present application.

The data transmission apparatus 500 may include: at least one processor 501, at least one network interface 504 or another user interface 503, a memory 505 and at least one communication bus 502. The communication bus 502 is used for implementing connections and communications between the components. The data transmission apparatus 500 may include a user interface 503, and may specifically include: a display (for example, a touch screen, an LCD, a CRT, holographic imaging or projection or the like), a pointing device (for example, a mouse, a trackball touch panel or touch screen or the like), a camera and/or a pickup device or the like.

The memory 505 may include a read-only memory and a random access memory, and provide instructions and data for the processor 501. A part in the memory 502 may further include a non-transitory computer readable storage medium such as non-volatile random access memory and the like.

In some implementation manners, the memory 505 stores the following elements, executable modules or data structures, or their subsets, or their extension sets: an operating system 5051, including various system programs, for implementing various basic services and processing hardware-based tasks; and an application module 5052, including various applications, for implementing various application services.

The application module 5052 includes, but is not limited to, a receiving unit 410, a first forwarding unit 420 and/or a second forwarding unit 430 and the like.

In this embodiment of the present application, by calling the programs or instructions stored in the memory 505, the processor 501 receives a first download request for a first data object sent by the first network node through a first transport layer protocol connection; if the data transmission apparatus 500 has not locally stored the first data object, a second transport layer protocol connection between the data transmission apparatus 500 and the third network node is established, a download request for the first data object is sent to the third network node through the second transport layer protocol connection, and a mapping relationship between the first transport layer protocol connection and the second transport layer protocol connection is recorded; if N1 second transport layer protocol data packets carrying data included in the first data object sent by third network node are received through the second transport layer protocol connection, and the amount of data included in the first data object carried by the N1 second transport layer protocol data packets is greater than or equal to a predefined data amount threshold, before next transport layer protocol data packet carrying data included in the first data object sent by third network node is received, according to the recorded mapping relationship between the first transport layer protocol connection and the second transport layer protocol connection, first transport layer protocol data packets are sent to the first network node through the first transport layer protocol connection having a mapping relationship with the second transport layer protocol connection, wherein the first transport layer protocol data packets carry the data included in the first data object carried by the N1 second transport layer protocol data packets received, wherein the N1 is a positive integer.

Transport layer protocols corresponding to the first transport layer protocol connection and the second transport layer protocol connection may be the same or different, for example, the transport layer protocol corresponding to the first transport layer protocol connection is a TCP, and the transport layer protocol corresponding to the second transport layer protocol connection is also a TCP. Alternatively, the transport layer protocol corresponding to the first transport layer protocol connection is a UDP, and the transport layer protocol corresponding to the second transport layer protocol connection is also a UDP. Alternatively, the transport layer protocol corresponding to the first transport layer protocol connection is a TCP, and the transport layer protocol corresponding to the second transport layer protocol connection is a UDP, or the transport layer protocol corresponding to the first transport layer protocol connection is a UDP, and the transport layer protocol corresponding to the second transport layer protocol connection is a TCP. Certainly, the transport layer protocols corresponding to the first transport layer protocol connection and the second transport layer protocol connection may be the same or different protocols.

In some embodiments of the present application, the step of recording a mapping relationship between the first transport layer protocol connection and the second transport layer protocol connection may include: generating a mapping relationship record for recording the mapping relationship between the first transport layer protocol connection and the second transport layer protocol connection, wherein the mapping relationship record includes a first protocol field and a second protocol field, wherein the first protocol field may record identification of the first transport layer protocol connection, and the second protocol field may record identification of the second transport layer protocol connection. The mapping relationship record may further include a timestamp field, wherein the timestamp field may record time of receiving a download request for a first data object sent by a first network node through a first transport layer protocol connection between the first network node and the data transmission apparatus 400, or the timestamp field may record time of establishing a second transport layer protocol connection between the data transmission apparatus 400 and a third network node, or the timestamp field may record time of sending a download request for the first data object to the third network node through the second transport layer protocol connection, or the timestamp field may record time of generating the mapping relationship record or the like. Certainly, the mapping relationship record may further include other fields.

In some embodiments of the present application, the processor 501 may encapsulate data included in the first data object obtained from one second transport layer protocol data packet into one or more first transport layer protocol data packets, and the processor 501 may also encapsulate data included in the first data object obtained from multiple second transport layer protocol data packets into one or more first transport layer protocol data packets. The processor 501 may determine the size of the first transport layer protocol data packets according to a current network status of the first transport layer protocol connection between the data transmission apparatus 500 and the first network node.

In some embodiments of the present application, the processor 501 may receive a download request for a first data object sent by a first network node through a first TCP connection or a first UDP connection between the first network node and the data transmission apparatus 500.

In some embodiments of the present application, in the respect of establishing a second transport layer protocol connection between the data transmission apparatus 500 and a third network node, the processor 501 may be specifically used for establishing a second UDP connection or a second TCP connection between the data transmission apparatus 500 and a third network node.

In some embodiments of the present application, the first data object is a file or file fragment.

If the first network node is also a transit network node, before the data transmission apparatus 500 receives a first download request for a first data object sent by a first network node through a first transport layer protocol connection between the first network node and the data transmission apparatus 500, the first network node may receive a download request for the first data object sent by a fourth network node through a third transport layer protocol connection between the first network node and the fourth network node (the fourth network node may be a request-starting network node, and may also be another transit network node), and records a mapping relationship between the third transport layer protocol connection and the first transport layer protocol connection. If the first network node receives N1 first transport layer protocol data packets carrying data included in the first data object sent by the data transmission apparatus 500 through the first transport layer protocol connection, and the amount of data included in the first data object carried by the N1 first transport layer protocol data packets is greater than or equal to a predefined data amount threshold, the first network node, before receiving a next first transport layer protocol data packet carrying data included in the first data object sent by the data transmission apparatus 500, according to the recorded mapping relationship between the first transport layer protocol connection and the third transport layer protocol connection, determines the third transport layer protocol connection having a mapping relationship with the first transport layer protocol connection, and sends one or more third transport layer protocol data packets to the fourth network node through the determined third transport layer protocol connection having a mapping relationship with the first transport layer protocol connection. The one or more third transport layer protocol data packets carry the data included in the first data object carried by the N1 first transport layer protocol data packets received.

The first network node may encapsulate data included in the first data object obtained from one first transport layer protocol data packet into one or more third transport layer protocol data packets, and the first network node may also encapsulate data included in the first data object obtained from multiple first transport layer protocol data packets into one or more third transport layer protocol data packets. The first network node may determine the size of the third transport layer protocol data packets according to a current network status of the third transport layer protocol connection between the first network node and the fourth network node.

Similarly, if the third network node is also a transit network node, after the third network node receives the download request for the first data object sent by the data transmission apparatus 500 through the second transport layer protocol connection, the third network node may establish a fourth transport layer protocol connection between the third network node and a fifth network node (the fifth network node may be a data source of the first data object, and may also be another transit network node), send a download request for the first data object to the fifth network node through the fourth transport layer protocol connection, and record a mapping relationship between the second transport layer protocol connection and the fourth transport layer protocol connection. If the third network node receives N1 fourth transport layer protocol data packets carrying data included in the first data object sent by the fifth network node through the fourth transport layer protocol connection, and the amount of data included in the first data object carried by the N1 fourth transport layer protocol data packets is greater than or equal to a predefined data amount threshold, the third network node, before receiving a next fourth transport layer protocol data packet carrying data included in the first data object sent by the fifth network node, according to the recorded mapping relationship between the second transport layer protocol connection and the fourth transport layer protocol connection, determines the second transport layer protocol connection having a mapping relationship with the fourth transport layer protocol connection, and sends at least one second transport layer protocol data packet to the data transmission apparatus 500 through the determined second transport layer protocol connection having a mapping relationship with the fourth transport layer protocol connection. The at least one second transport layer protocol data packet carries the data included in the first data object carried by the N1 fourth transport layer protocol data packets received.

The third network node may encapsulate data included in the first data object obtained from one fourth transport layer protocol data packet into one or more second transport layer protocol data packets, and the third network node may also encapsulate data included in the first data object obtained from multiple fourth transport layer protocol data packets into one or more second transport layer protocol data packets. The third network node may determine the size of the second transport layer protocol data packets according to a current network status of the second transport layer protocol connection between the third network node and the data transmission apparatus 500.

In some embodiments of the present application, if the first network node is a request-starting network node of the first data object, the first network node, after receiving N transport layer protocol data packets (that is, N first transport layer protocol data packets) carrying data included in the first data object sent by the data transmission apparatus 500 through the first transport layer protocol connection, may utilize the data included in the first data object carried by the N transport layer protocol data packets for integrity check on the first data object.

In some embodiments of the present application, the predefined data amount threshold is greater than or equal to the amount of data included in the first data object carried by any one first transport layer protocol data packet that the second network node has sent to the first network node; or the predefined data amount threshold is greater than or equal to an average size of the amount of data included in the first data object carried by N2 first transport layer protocol data packets that the second network node has sent to the first network node, wherein the N2 is a positive integer; or the predefined data amount threshold is greater than or equal to the maximum or minimum amount of data included in the first data object carried by first transport layer protocol data packets that the second network node has sent to the first network node; or the predefined data amount threshold is greater than or equal to the maximum or minimum amount of data included in the first data object that could be carried by first transport layer protocol data packets that the second network node has sent to the first network node; or the predefined data amount threshold is greater than or equal to the amount of data included in the first data object carried by any one second transport layer protocol data packet received from the third network node by the second network node; or the predefined data amount threshold is greater than or equal to an average size of the amount of data included in the first data object carried by N3 second transport layer protocol data packets received from the third network node by the second network node, wherein the N3 is a positive integer; or the predefined data amount threshold is greater than or equal to an average size of the amount of data included in the first data object carried by all second transport layer protocol data packets received from the third network node by the second network node; or the predefined data amount threshold is greater than or equal to the maximum or minimum amount of data included in the first data object carried by second transport layer protocol data packets received from the third network node by the second network node; or the predefined data amount threshold is greater than or equal to 0 byte.

Certainly, the predefined data amount threshold may also be another preset value, and of course, the predefined data amount threshold is less than the total amount of data included in the first data object.

It may be seen that, in the solution of this embodiment, after a data transmission apparatus 500 as a transit network node receives a first download request for a first data object sent by a first network node through a first transport layer protocol connection between the first network node and the data transmission apparatus 500, if finding that the data transmission apparatus 500 has not locally stored the first data object, the data transmission apparatus 500 establishes a second transport layer protocol connection between the data transmission apparatus 500 and a third network node, sends a download request for the first data object to the third network node through the second transport layer protocol connection, and records a mapping relationship between the first transport layer protocol connection and the second transport layer protocol connection. As the data transmission apparatus 500 as a transit network node establishes the mapping relationship between the first transport layer protocol connection and the second transport layer protocol connection, when N1 second transport layer protocol data packets carrying data included in the first data object sent by the third network node are received, and the amount of data included in the first data object carried by the N1 second transport layer protocol data packets is greater than or equal to a predefined data amount threshold, the data transmission apparatus 500, before receiving next transport layer protocol data packet carrying data included in the first data object sent by the third network node, sends first transport layer protocol data packets carrying data included in the first data object to the first network node directly through the first transport layer protocol connection having a mapping relationship with the second transport layer protocol connection, and in the mechanism, as the first data object may need to be carried through multiple transport layer protocol data packets, the data transmission apparatus 500 as a transit network node does not need to wait after complete first data object is received (that is, it is unnecessary to wait after all transport layer protocol data packets carrying the data of first data object are received) and then return the complete first data object to the first network node, but adopts a similar asynchronous manner to step by step forward data included in the first object data carried by transport layer protocol data packets from the third network node to the first network node through the transport layer protocol data packets, this is favorable for greatly reducing time in which the transit network node waits to receive the transport layer protocol data packets for carrying the first data object, favorable for greatly reducing time in which the data included in the first data object is transferred from the third network node to the first network node, and favorable for reducing transmission delay between a data source of the first data object and a request-starting network node of the first data object, and by greatly reducing the delay, it is favorable for enhancing user product experience.

Figure 6:
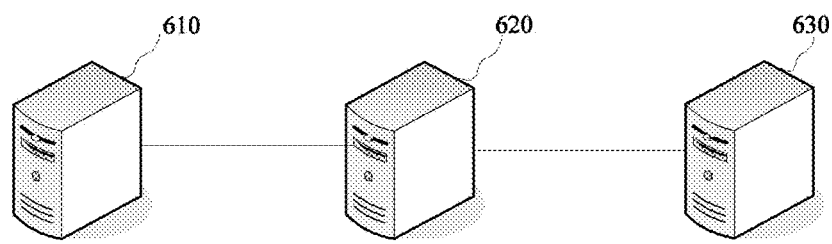
FIG. 6 is a schematic view of a data transmission system according to an embodiment of the present application.

Referring to FIG. 6, the embodiments of the present application further provide a data transmission system, which may include: a first network node 610, a second network node 620 and a third network node 630.

The first network node 610 is used for sending a download request for a first data object to the second network node 620 through a first transport layer protocol connection between the first network node 610 and the second network node 620.

The second network node 620 is used for receiving the download request for a first data object sent by the first network node 610 through the first transport layer protocol connection; if the second network node 620 has not locally stored the first data object, establishing a second transport layer protocol connection between the second network node 620 and the third network node 630, sending a download request for the first data object to the third network node 630 through the second transport layer protocol connection, and recording a mapping relationship between the first transport layer protocol connection and the second transport layer protocol connection; if N1 second transport layer protocol data packets carrying data included in the first data object sent by the third network node 630 are received through the second transport layer protocol connection, and the amount of data included in the first data object carried by the N1 second transport layer protocol data packets is greater than or equal to a predefined data amount threshold, before next transport layer protocol data packet carrying data included in the first data object sent by the third network node 630 is received, according to the recorded mapping relationship between the first transport layer protocol connection and the second transport layer protocol connection, sending first transport layer protocol data packets to the first network node 610 through the first transport layer protocol connection having a mapping relationship with the second transport layer protocol connection, wherein the first transport layer protocol data packets carry the data included in the first data object carried by the N1 second transport layer protocol data packets received, wherein the N1 is a positive integer.

The first network node 610 may be a request-starting network node of the first data object (that is, initiate a download request for downloading the first data object), and the first network node 610 may also be a transit network node between a data source and a request-starting network node.

Transport layer protocols corresponding to the first transport layer protocol connection and the second transport layer protocol connection may be the same or different, for example, the transport layer protocol corresponding to the first transport layer protocol connection is a TCP, and the transport layer protocol corresponding to the second transport layer protocol connection is also a TCP. Alternatively, the transport layer protocol corresponding to the first transport layer protocol connection is a UDP, and the transport layer protocol corresponding to the second transport layer protocol connection is also a UDP. Alternatively, the transport layer protocol corresponding to the first transport layer protocol connection is a TCP, and the transport layer protocol corresponding to the second transport layer protocol connection is a UDP, or the transport layer protocol corresponding to the first transport layer protocol connection is a UDP, and the transport layer protocol corresponding to the second transport layer protocol connection is a TCP. Certainly, the transport layer protocols corresponding to the first transport layer protocol connection and the second transport layer protocol connection may be the same or different protocols.

In some embodiments of the present application, the step of recording a mapping relationship between the first transport layer protocol connection and the second transport layer protocol connection may include: generating a mapping relationship record for recording the mapping relationship between the first transport layer protocol connection and the second transport layer protocol connection, wherein the mapping relationship record includes a first protocol field and a second protocol field, wherein the first protocol field may record identification of the first transport layer protocol connection, and the second protocol field may record identification of the second transport layer protocol connection. The mapping relationship record may further include a timestamp field, wherein the timestamp field may record time of receiving a download request for a first data object sent by the first network node 610 through a first transport layer protocol connection between the first network node 610 and the second network node 620, or the timestamp field may record time of establishing a second transport layer protocol connection between the second network node 620 and the third network node 630, or the timestamp field may record time of sending a download request for the first data object to the third network node 630 through the second transport layer protocol connection, or the timestamp field may record time of generating the mapping relationship record or the like. Certainly, the mapping relationship record may further include other fields.

The second network node 620 may encapsulate data included in the first data object obtained from one second transport layer protocol data packet into one or more first transport layer protocol data packets, and the second network node 620 may also encapsulate data included in the first data object obtained from multiple second transport layer protocol data packets into one or more first transport layer protocol data packets. The second network node 620 may determine the size of the first transport layer protocol data packets according to a current network status of the first transport layer protocol connection between the second network node 620 and the first network node 610.

It may be understood that, when transmitting the first data object, the first network node 610 may be regarded as a downstream network node of the second network node 620, the second network node 620 is a downstream network node of the third network node 630, if the first network node 610 is a request-starting network node of the first data object, the second network node 620 may be regarded as a transit network node, and the third network node 630 may be a data source or a transit network node. In this embodiment of the present application, there may be one or more transit network nodes including the second network node 620 between the data source and the request-starting network node of the first data object.

If the first network node 610 is also a transit network node, before the second network node 620 receives a first download request for a first data object sent by the first network node 610 through a first transport layer protocol connection between the first network node 610 and the second network node 620, the first network node 610 may receive a download request for the first data object sent by a fourth network node through a third transport layer protocol connection between the first network node 610 and the fourth network node (the fourth network node may be a request-starting network node, and may also be another transit network node), and record a mapping relationship between the third transport layer protocol connection and the first transport layer protocol connection. If the first network node 610 receives N1 first transport layer protocol data packets carrying data included in the first data object sent by the second network node 620 through the first transport layer protocol connection, and the amount of data included in the first data object carried by the N1 first transport layer protocol data packets is greater than or equal to a predefined data amount threshold, the first network node 610, before receiving a next first transport layer protocol data packet carrying data included in the first data object sent by the second network node 620, according to the recorded mapping relationship between the first transport layer protocol connection and the third transport layer protocol connection, determines the third transport layer protocol connection having a mapping relationship with the first transport layer protocol connection, and sends one or more third transport layer protocol data packets to the fourth network node through the determined third transport layer protocol connection having a mapping relationship with the first transport layer protocol connection. The one or more third transport layer protocol data packets carries/carry the data included in the first data object carried by the N1 first transport layer protocol data packets received.

The first network node 610 may encapsulate data included in the first data object obtained from one first transport layer protocol data packet into one or more third transport layer protocol data packets, and the first network node 610 may also encapsulate data included in the first data object obtained from multiple first transport layer protocol data packets into one or more third transport layer protocol data packets. The first network node 610 may determine the size of the third transport layer protocol data packets according to a current network status of the third transport layer protocol connection between the first network node 610 and the fourth network node.

Similarly, if the third network node 630 is also a transit network node, after the third network node 630 receives the download request for the first data object sent by the second network node 620 through the second transport layer protocol connection, the third network node 630 may establish a fourth transport layer protocol connection between the third network node 630 and a fifth network node (the fifth network node may be a data source of the first data object, and may also be another transit network node), send a download request for the first data object to the fifth network node through the fourth transport layer protocol connection, and record a mapping relationship between the second transport layer protocol connection and the fourth transport layer protocol connection. If the third network node 630 receives N1 fourth transport layer protocol data packets carrying data included in the first data object sent by the fifth network node through the fourth transport layer protocol connection, and the amount of data included in the first data object carried by the N1 fourth transport layer protocol data packets is greater than or equal to a predefined data amount threshold, the third network node 630, before receiving a next fourth transport layer protocol data packet carrying data included in the first data object sent by the fifth network node, according to the recorded mapping relationship between the second transport layer protocol connection and the fourth transport layer protocol connection, determines the second transport layer protocol connection having a mapping relationship with the fourth transport layer protocol connection, and sends at least one second transport layer protocol data packet to the second network node 620 through the determined second transport layer protocol connection having a mapping relationship with the fourth transport layer protocol connection. The at least one second transport layer protocol data packet carries the data included in the first data object carried by the N1 fourth transport layer protocol data packets received.

The third network node 630 may encapsulate data included in the first data object obtained from one fourth transport layer protocol data packet into one or more second transport layer protocol data packets, and the third network node 630 may also encapsulate data included in the first data object obtained from multiple fourth transport layer protocol data packets into one or more second transport layer protocol data packets. The third network node 630 may determine the size of the third transport layer protocol data packets according to a current network status of the second transport layer protocol connection between the third network node 630 and the second network node 620.

In some embodiments of the present application, in the respect of receiving a download request for a first data object sent by the first network node 610 through a first transport layer protocol connection between the first network node 610 and the second network node 620, the second network node 620 may be specifically used for receiving a download request for a first data object sent by the first network node 610 through a first TCP connection or a first UDP connection between the first network node 610 and the second network node 620.

In some embodiments of the present application, in the respect of establishing a second transport layer protocol connection between the second network node 620 and the third network node 630, the second network node 620 may be specifically used for establishing a second UDP connection or a second TCP connection between the second network node 620 and the third network node 630.

In some embodiments of the present application, if the first network node 610 is a request-starting network node of the first data object, the first network node 610 is further used for, after receiving N transport layer protocol data packets carrying data included in the first data object sent by the second network node 620 through the first transport layer protocol connection, utilizing the data included in the first data object carried by the N transport layer protocol data packets for integrity check on the first data object.

It may be understood that the data source (for example, the third network node 630) of the first data object may return the total number of the first data object to the request-starting network node (which is assumed as the first network node 610) through an application layer message (certainly, the first network node 610 may also know the total number of the first data object in another manner), therefore, the first network node 610 may de-encapsulate the received N transport layer protocol data packets to obtain the data included in the first data object carried by the N transport layer protocol data packets, accumulate the amount of data included in the first data object carried by the N transport layer protocol data packets, and check integrity of the first data object by comparing whether the total number of the first data object is equal to the accumulated data amount, wherein the N is a positive integer.

In some embodiments of the present application, the first data object is a file or file fragment (the file fragment refers to one or more slices of a file).

In some embodiments of the present application, the predefined data amount threshold is greater than or equal to the amount of data included in the first data object carried by any one first transport layer protocol data packet that the second network node has sent to the first network node; or the predefined data amount threshold is greater than or equal to an average size of the amount of data included in the first data object carried by N2 first transport layer protocol data packets that the second network node has sent to the first network node, wherein the N2 is a positive integer; or the predefined data amount threshold is greater than or equal to the maximum or minimum amount of data included in the first data object carried by first transport layer protocol data packets that the second network node has sent to the first network node; or the predefined data amount threshold is greater than or equal to the maximum or minimum amount of data included in the first data object that could be carried by first transport layer protocol data packets that the second network node has sent to the first network node; or the predefined data amount threshold is greater than or equal to the amount of data included in the first data object carried by any one second transport layer protocol data packet received from the third network node by the second network node; or the predefined data amount threshold is greater than or equal to an average size of the amount of data included in the first data object carried by N3 second transport layer protocol data packets received from the third network node by the second network node, wherein the N3 is a positive integer; or the predefined data amount threshold is greater than or equal to an average size of the amount of data included in the first data object carried by all second transport layer protocol data packets received from the third network node by the second network node; or the predefined data amount threshold is greater than or equal to the maximum or minimum amount of data included in the first data object carried by second transport layer protocol data packets received from the third network node by the second network node; or the predefined data amount threshold is greater than or equal to 0 byte.

Certainly, the predefined data amount threshold may also be another preset value, and of course, the predefined data amount threshold is less than the total amount of data included in the first data object.

It may be seen that, in the solution of this embodiment, after a second network node 620 as a transit network node receives a first download request for a first data object sent by a first network node 610 through a first transport layer protocol connection between the first network node 610 and the second network node 620, if finding that the second network node 620 has not locally stored the first data object, the second network node 620 establishes a second transport layer protocol connection between the second network node 620 and a third network node 630, sends a download request for the first data object to the third network node 630 through the second transport layer protocol connection, and records a mapping relationship between the first transport layer protocol connection and the second transport layer protocol connection. As the second network node 620 as a transit network node establishes the mapping relationship between the first transport layer protocol connection and the second transport layer protocol connection, when N1 second transport layer protocol data packets carrying data included in the first data object sent by the third network node 630 are received, and the amount of data included in the first data object carried by the N1 second transport layer protocol data packets is greater than or equal to a predefined data amount threshold, the second network node 620, before receiving next transport layer protocol data packet carrying data included in the first data object sent by the third network node 630, sends first transport layer protocol data packets carrying data included in the first data object to the first network node 610 directly through the first transport layer protocol connection having a mapping relationship with the second transport layer protocol connection, and in the mechanism, as the first data object may need to be carried through multiple transport layer protocol data packets, the second network node 620 as a transit network node does not need to wait after complete first data object is received (that is, it is unnecessary to wait after all transport layer protocol data packets carrying the data of first data object are received) and then return the complete first data object to the first network node 610, but adopts a similar asynchronous manner to step by step forward data included in the first object data carried by transport layer protocol data packets from the third network node 630 to the first network node 610 through the transport layer protocol data packets, this is favorable for greatly reducing time in which the transit network node waits to receive the transport layer protocol data packets for carrying the first data object, favorable for greatly reducing time in which the data included in the first data object is transferred from the third network node 630 to the first network node 610, and favorable for reducing transmission delay between a data source of the first data object and a request-starting network node of the first data object, and by greatly reducing the delay, it is favorable for enhancing user product experience.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A computer-implement method, comprising:
   at a second network node having one or more processors and memory storing programs executed by the one or more processors, wherein the second network node is a transit network node that is communicatively connected between a first network node and a third network node, and wherein the first network node is a predetermined downstream network node of the second network node, and the second network node is a predetermined downstream network node of the third network node:
      receiving a first download request for a first data object including a plurality of data packets from the first network node through a first transport layer protocol connection established between the first network node and the second network node;
      determining whether the first data object is locally stored at the second network node or not;
      in accordance with a determination that the first data object is not locally stored at the second network node:
         establishing a second transport layer protocol connection between the second network node and the third network node;
         sending a second download request for the first data object to the third network node through the second transport layer protocol connection; and
         establishing a mapping relationship between the first transport layer protocol connection and the second transport layer protocol connection, comprising:
            associating (1) the first transport layer protocol connection between the first network node and the second network node and (2) the second transport layer protocol connection between the second network node and the third network node with (3) transmission of data packets of the first data object, such that data packets of the first data object received by the second network node from the third network node through the second transport layer protocol are transmitted to the first network node from the second network node through the first transport layer protocol; and
            storing, at the second network node, the mapping relationship including an association specific to a project related to transmitting the data packets of the first data object and a timestamp field including time information of the second network node receiving the first download request from the first network node; and
         receiving N1 data packets of the first data object from the third network node through the second transport layer protocol connection, the N1 data packets being an incomplete portion of the first data object;

while continuing receiving more packets of the first data object from the third network node:

determining whether a total amount of data in the N1 data packets of the first data object exceeds a predefined data amount threshold;

continuing to receive more packets of the first data object until the total amount of data in the N1 data packets of the first data object exceeds the predefined data amount threshold, comprising:

checking the established mapping relationship to identify the first transport layer protocol connection between the first network node and the second network node, based on the association established in the mapping relationship and specific to the project related to transmitting the data packets of the first data object and that the N1 data packets of the first data object are received by the second network node from the third network node through the second transport layer protocol connection; and starting transmitting the data in the N1 data packets of the first data object from the second network node to the first network node through the identified first transport layer protocol connection according to the association established in the mapping relationship between the first transport layer protocol connection, the second transport layer protocol connection, and the transmission of data packets of the first data object, without performing data integrity check to any of the received N1 data packets.

2. The method of claim 1, wherein the first transport layer protocol is different from the second transport layer protocol and the method further comprising:

extracting the data corresponding to the first data object from the N1 data packets;

packeting the extracted data corresponding to the first data object into one or more data packets in accordance with the first transport layer protocol; and sending the one or more data packets corresponding to the first transport layer protocol to the first network node through the first transport layer protocol connection.

3. The method of claim 2, wherein the first transport layer protocol is a first one of transmission control protocol and user datagram protocol and the second transport layer protocol is a second one of the transmission control protocol and user datagram protocol.

4. The method of claim 1, wherein the predefined data amount threshold is greater than or equal to at least one of the following:

the amount of data included in the first data object carried by any one first transport layer protocol data packet that the second network node has sent to the first network node;

an average size of the amount of data included in the first data object carried by N2 first transport layer protocol data packets that the second network node has sent to the first network node, wherein the N2 is a positive integer;

the amount of data included in the first data object carried by any one second transport layer protocol data packet received from the third network node by the second network node;

an average size of the amount of data included in the first data object carried by N3 second transport layer protocol data packets received from the third network node by the second network node, wherein the N3 is a positive integer; and an average size of the amount of data included in the first data object carried by all second transport layer protocol data packets received from the third network node by the second network node.

5. The method of claim 1, wherein the mapping relationship between the first transport layer protocol connection and the second transport layer protocol connection further includes a first protocol field and a second protocol field, the first protocol field including identification of the first transport layer protocol connection and the second protocol field including identification of the second transport layer protocol connection.

6. The method of claim 1, wherein the timestamp field further includes at least one of the following: (i) time information of the second network node establishing the second transport layer protocol connection to the third network node, (ii) time information of the second network node sending the second download request to the third network node, and (iii) time information of the second node recording the mapping relationship.

7. A computer system acting as a second node, comprising:

one or more processors;

memory; and one or more programs modules stored in the memory and configured for execution by the one or more processors, the one or more program modules including instruction for:

receiving a first download request for a first data object including a plurality of data packets from a first network node through a first transport layer protocol connection established between the first network node and the second network node, wherein the second network node is a transit network node that is communicatively connected between the first network node and a third network node, and wherein the first network node is a predetermined downstream network node of the second network node, and the second network node is a predetermined downstream network node of the third network node;

determining whether the first data object is locally stored at the second network node or not;

in accordance with a determination that the first data object is not locally stored at the second network node:

establishing a second transport layer protocol connection between the second network node and the third network node;

sending a second download request for the first data object to the third network node through the second transport layer protocol connection; and establishing a mapping relationship between the first transport layer protocol connection and the second transport layer protocol connection, comprising:

associating (1) the first transport layer protocol connection between the first network node and the second network node and (2) the second transport layer protocol connection between the second network node and the third network node with (3) transmission of data packets of the first data object, such that data packets of the first data object received by the second network node from the third network node through the second transport layer protocol are transmitted to the first network node from the second network node through the first transport layer protocol; and storing, at the second network node, the mapping relationship including an association specific to a project related to transmitting the data packets of the first data object and a timestamp field including time information of the second network node receiving the first download request from the first network node; and receiving N1 data packets of the first data object from the third network node through the second transport layer protocol connection, the N1 data packets being an incomplete portion of the first data object;

while continuing receiving more packets of the first data object from the third network node:

determining whether a total amount of data in the N1 data packets of the first data object exceeds a predefined data amount threshold;

continuing to receive more packets of the first data object until the total amount of data in the N1 data packets of the first data object exceeds a predefined data amount threshold, comprising:

checking the established mapping relationship to identify the first transport layer protocol connection between the first network node and the second network node, based on the association established in the mapping relationship and specific to the project related to transmitting the data packets of the first data object and that the N1 data packets of the first data object are received by the second network node from the third network node through the second transport layer protocol connection; and starting transmitting the data in the N1 data packets of the first data object from the second network node to the first network node through the identified first transport layer protocol connection according to the association established in the mapping relationship between the first transport layer protocol connection and the second transport layer protocol connection, and the transmission of data packets of the first data object, without performing data integrity check to any of the received N1 data packets.

8. The computer system of claim 7, wherein the first transport layer protocol is different from the second transport layer protocol and the one or more program modules further include instructions for:

extracting the data corresponding to the first data object from the N1 data packets;

packeting the extracted data corresponding to the first data object into one or more data packets in accordance with the first transport layer protocol; and sending the one or more data packets corresponding to the first transport layer protocol to the first network node through the first transport layer protocol connection.

9. The computer system of claim 8, wherein the first transport layer protocol is a first one of transmission control protocol and user datagram protocol and the second transport layer protocol is a second one of the transmission control protocol and user datagram protocol.

10. The computer system of claim 7, wherein the predefined data amount threshold is greater than or equal to at least one of the following:

the amount of data included in the first data object carried by any one first transport layer protocol data packet that the second network node has sent to the first network node;

an average size of the amount of data included in the first data object carried by N2 first transport layer protocol data packets that the second network node has sent to the first network node, wherein the N2 is a positive integer;

the amount of data included in the first data object carried by any one second transport layer protocol data packet received from the third network node by the second network node;

an average size of the amount of data included in the first data object carried by N3 second transport layer protocol data packets received from the third network node by the second network node, wherein the N3 is a positive integer; and an average size of the amount of data included in the first data object carried by all second transport layer protocol data packets received from the third network node by the second network node.

11. The computer system of claim 7, wherein the mapping relationship between the first transport layer protocol connection and the second transport layer protocol connection further includes a first protocol field and a second protocol field, the first protocol field including identification of the first transport layer protocol connection and the second protocol field including identification of the second transport layer protocol connection.

12. The computer system of claim 7, wherein the timestamp field further includes at least one of the following: (i) time information of the second network node establishing the second transport layer protocol connection to the third network node, (ii) time information of the second network node sending the second download request to the third network node, and (iii) time information of the second node recording the mapping relationship.

13. A non-transitory computer readable storage medium having stored therein one or more instructions, which, when executed by a computer system acting as a second node, cause the computer system to perform the following instructions:

receiving a first download request for a first data object including a plurality of data packets from a first network node through a first transport layer protocol connection established between the first network node and the second network node, wherein the second network node is a transit network node that is communicatively connected between the first network node and a third network node, and wherein the first network node is a predetermined downstream network node of the second network node, and the second network node is a predetermined downstream network node of the third network node;

determining whether the first data object is locally stored at the second network node or not;

in accordance with a determination that the first data object is not locally stored at the second network node:

establishing a second transport layer protocol connection between the second network node and the third network node;

sending a second download request for the first data object to the third network node through the second transport layer protocol connection; and establishing a mapping relationship between the first transport layer protocol connection and the second transport layer protocol connection, comprising:

associating (1) the first transport layer protocol connection between the first network node and the second network node and (2) the second transport layer protocol connection between the second network node and the third network node with (3) transmission of data packets of the first data object, such that data packets of the first data object received by the second network node from the third network node through the second transport layer protocol are transmitted to the first network node from the second network node through the first transport layer protocol; and storing, at the second network node, the mapping relationship including an association specific to a project related to transmitting the data packets of the first data object and a timestamp field including time information of the second network node receiving the first download request from the first network node; and receiving N1 data packets of the first data object from the third network node through the second transport layer protocol connection, the N1 data packets being an incomplete portion of the first data object;

while continuing receiving more packets of the first data object from the third network node:

determining whether a total amount of data in the N1 data packets of the first data object exceeds a predefined data amount threshold;

continuing to receive more packets of the first data object until the total amount of data in the N1 data packets of the first data object exceeds a predefined data amount threshold, comprising:

checking the established mapping relationship to identify the first transport layer protocol connection between the first network node and the second network node, based on the association established in the mapping relationship and specific to the project related to transmitting the data packets of the first data object and that the N1 data packets of the first data object are received by the second network node from the third network node through the second transport layer protocol connection; and starting transmitting the data in the N1 data packets of the first data object from the second network node to the first network node through the identified first transport layer protocol connection according to the association established in the mapping relationship between the first transport layer protocol connection, the second transport layer protocol connection, and the transmission of data packets of the first data object, without performing data integrity check to any of the received N1 data packets.

14. The non-transitory computer readable storage medium of claim 13, wherein the first transport layer protocol is different from the second transport layer protocol and the computer system is further configured to perform the following instructions:

extracting the data corresponding to the first data object from the N1 data packets;

packeting the extracted data corresponding to the first data object into one or more data packets in accordance with the first transport layer protocol; and sending the one or more data packets corresponding to the first transport layer protocol to the first network node through the first transport layer protocol connection.

15. The non-transitory computer readable storage medium of claim 14, wherein the first transport layer protocol is a first one of transmission control protocol and user datagram protocol and the second transport layer protocol is a second one of the transmission control protocol and user datagram protocol.

16. The non-transitory computer readable storage medium of claim 13, wherein the predefined data amount threshold is greater than or equal to at least one of the following:

the amount of data included in the first data object carried by any one first transport layer protocol data packet that the second network node has sent to the first network node;

an average size of the amount of data included in the first data object carried by N2 first transport layer protocol data packets that the second network node has sent to the first network node, wherein the N2 is a positive integer;

the amount of data included in the first data object carried by any one second transport layer protocol data packet received from the third network node by the second network node;

an average size of the amount of data included in the first data object carried by N3 second transport layer protocol data packets received from the third network node by the second network node, wherein the N3 is a positive integer; and an average size of the amount of data included in the first data object carried by all second transport layer protocol data packets received from the third network node by the second network node.

17. The non-transitory computer readable storage medium of claim 13, wherein the mapping relationship between the first transport layer protocol connection and the second transport layer protocol connection further includes a first protocol field and a second protocol field, the first protocol field including identification of the first transport layer protocol connection and the second protocol field including identification of the second transport layer protocol connection.

18. The non-transitory computer readable storage medium of claim 13, wherein the timestamp field further includes at least one of the following: (i) time information of the second network node establishing the second transport layer protocol connection to the third network node, (ii) time information of the second network node sending the second download request to the third network node, and (iii) time information of the second node recording the mapping relationship.

\* \* \* \* \*